United States Patent
Tanaka et al.

(10) Patent No.: US 11,485,815 B2
(45) Date of Patent: Nov. 1, 2022

(54) 4-METHYL-1-PENTENE POLYMER PARTICLE AND METHOD FOR PRODUCING 4-METHYL-1-PENTENE RESIN

(71) Applicant: MITSUI CHEMICALS, INC., Tokyo (JP)

(72) Inventors: Masakazu Tanaka, Yokohama (JP); Toyoaki Sasaki, Narashino (JP); Tomoaki Matsugi, Kisarazu (JP); Sadahiko Matsuura, Iwakuni (JP); Naoto Matsukawa, Hatsukaichi (JP); Masatoshi Chinaka, Iwakuni (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 17/045,912

(22) PCT Filed: Apr. 9, 2019

(86) PCT No.: PCT/JP2019/015395
§ 371 (c)(1),
(2) Date: Oct. 7, 2020

(87) PCT Pub. No.: WO2019/198694
PCT Pub. Date: Oct. 17, 2019

(65) Prior Publication Data
US 2021/0032397 A1    Feb. 4, 2021

(30) Foreign Application Priority Data

Apr. 11, 2018  (JP) .............................. JP2018-076025
Apr. 11, 2018  (JP) .............................. JP2018-076026

(51) Int. Cl.
*C08F 297/08* (2006.01)
(52) U.S. Cl.
CPC ................................ *C08F 297/08* (2013.01)
(58) Field of Classification Search
CPC .................................................... C08F 297/08
See application file for complete search history.

(56) References Cited

U.S. PATENT DOCUMENTS

| | | |
|---|---|---|
| 4,801,650 A | 1/1989 | Wakatsuki et al. |
| 5,120,696 A | 6/1992 | Tsutsui et al. |
| 5,145,818 A | 9/1992 | Tsutsui et al. |
| 5,182,330 A | 1/1993 | Stricklen et al. |
| 5,266,544 A | 11/1993 | Tsutsui et al. |
| 5,519,091 A | 5/1996 | Tsutsui et al. |
| 5,605,969 A | 2/1997 | Tsutsui et al. |
| 5,700,750 A | 12/1997 | Tsutsui et al. |
| 5,807,801 A | 9/1998 | Tsutsui et al. |
| 6,156,844 A | 12/2000 | Hashimoto et al. |
| 6,743,863 B2 | 6/2004 | Iizuka et al. |
| 6,838,522 B2 | 1/2005 | Hashimoto et al. |
| 6,930,152 B2 | 8/2005 | Hashimoto et al. |
| 7,193,100 B2 | 3/2007 | Sangokoya et al. |
| 7,355,058 B2 | 4/2008 | Luo et al. |
| 7,803,888 B2 | 9/2010 | Kawahara et al. |
| 7,960,488 B2 | 6/2011 | Luo et al. |
| 8,058,379 B2 | 11/2011 | Yasuda et al. |
| 8,404,880 B2 | 3/2013 | Kaji et al. |
| 8,629,075 B2 | 1/2014 | Matsumoto et al. |
| 8,841,398 B2 | 9/2014 | Tanaka |
| 8,975,353 B2 | 3/2015 | Tanaka et al. |
| 9,340,630 B2 | 5/2016 | Kaji et al. |
| 9,458,257 B2 | 10/2016 | Funaya et al. |
| 9,593,176 B2 | 3/2017 | Tanaka |
| 9,676,879 B2 | 6/2017 | Tsurugi et al. |
| 9,896,526 B2 | 2/2018 | Funaya et al. |
| 10,150,823 B2 | 12/2018 | Tsurugi et al. |
| 10,336,837 B2 | 7/2019 | Funaya et al. |

(Continued)

FOREIGN PATENT DOCUMENTS

| | | |
|---|---|---|
| EP | 0 527 475 A1 | 2/1993 |
| JP | S62-230802 A | 10/1987 |

(Continued)

OTHER PUBLICATIONS

International Search Report dated Jun. 11, 2019 for corresponding International Patent Application No. PCT/JP2019/015395.

(Continued)

*Primary Examiner* — Robert D Harlan
(74) *Attorney, Agent, or Firm* — Foley & Lardner LLP

(57) ABSTRACT

A 4-methyl-1-pentene polymer particle (X) which satisfies the following requirements (X-a), (X-b) and (X-c): (X-a) being composed of a 4-methyl-1-pentene polymer which has a content of a constitutional unit derived from 4-methyl-1-pentene being 30.0 to 99.7% by mol, and a content of a constitutional unit derived from at least one olefin selected from ethylene and an α-olefin having 3 to 20 carbon atoms (except for 4-methyl-1-pentene) being 0.3 to 70.0% by mol; (X-b) having, when measured in a cross fractionation chromatograph apparatus (CFC) using an infrared spectrophotometer as a detector part, at least one peak A of an amount of a component eluted present in the range of 100 to 140° C., and at least one peak B of an amount of a component eluted present at lower than 100° C.; and (X-c) having a meso diad fraction (m) measured by $^{13}$C-NMR falling within the range of 95.0 to 100%.

19 Claims, 5 Drawing Sheets

(56) References Cited

U.S. PATENT DOCUMENTS

| | | |
|---|---|---|
| 10,336,838 B2 | 7/2019 | Funaya et al. |
| 10,870,715 B2 | 12/2020 | Tsurugi et al. |
| 2002/0045712 A1 | 4/2002 | Hashimoto et al. |
| 2003/0036606 A1 | 2/2003 | Iizuka et al. |
| 2003/0130428 A1 | 7/2003 | Hashimoto et al. |
| 2004/0230004 A1 | 11/2004 | Hashimoto et al. |
| 2005/0143254 A1 | 6/2005 | Sangokoya et al. |
| 2006/0287448 A1 | 12/2006 | Luo et al. |
| 2007/0249792 A1 | 10/2007 | Kawahara et al. |
| 2008/0004412 A1 | 1/2008 | Matsumoto et al. |
| 2009/0088541 A1 | 4/2009 | Luo et al. |
| 2010/0179295 A1 | 7/2010 | Yasuda et al. |
| 2010/0298517 A1 | 11/2010 | Tanaka |
| 2010/0324239 A1 | 12/2010 | Matsumoto et al. |
| 2011/0282017 A1 | 11/2011 | Kaji et al. |
| 2014/0343241 A1 | 11/2014 | Tanaka |
| 2015/0017365 A1 | 1/2015 | Sohn et al. |
| 2015/0057418 A1 | 2/2015 | Kaji et al. |
| 2015/0239996 A1 | 8/2015 | Funaya et al. |
| 2015/0376306 A1* | 12/2015 | Tsurugi ............... C08F 110/02 526/185 |
| 2016/0376385 A1 | 12/2016 | Funaya et al. |
| 2017/0240664 A1 | 8/2017 | Tsurugi et al. |
| 2017/0327610 A1 | 11/2017 | Funaya et al. |
| 2017/0327611 A1 | 11/2017 | Funaya et al. |
| 2019/0048109 A1 | 2/2019 | Tanaka et al. |
| 2019/0062470 A1 | 2/2019 | Tsurugi et al. |

FOREIGN PATENT DOCUMENTS

| | | |
|---|---|---|
| JP | S63-063707 A | 3/1988 |
| JP | H03-203905 A | 9/1991 |
| JP | H03-203906 A | 9/1991 |
| JP | H03-234718 A | 10/1991 |
| JP | H05-271341 A | 10/1993 |
| JP | H05-320245 A | 12/1993 |
| JP | H06-184240 A | 7/1994 |
| JP | H06-313007 A | 11/1994 |
| JP | H10-231311 A | 9/1998 |
| JP | 2003-049027 A | 2/2003 |
| JP | 2006-291020 A | 10/2006 |
| JP | 2013-169685 A | 9/2013 |
| JP | 2014-208797 A | 11/2014 |
| JP | 2016-098257 A | 5/2016 |
| JP | 2017-178982 A | 10/2017 |
| JP | 2019-188680 A | 10/2019 |
| WO | WO-94/16009 A1 | 7/1994 |
| WO | WO-03/082879 A1 | 10/2003 |
| WO | WO-2005/066191 A1 | 7/2005 |
| WO | WO-2005/121192 A1 | 12/2005 |
| WO | WO-2006/054613 A1 | 5/2006 |
| WO | WO-2007/131010 A2 | 11/2007 |
| WO | WO-2009/008409 A1 | 1/2009 |
| WO | WO-2010/055652 A1 | 5/2010 |
| WO | WO-2013/146337 A1 | 10/2013 |
| WO | WO-2014/050817 A1 | 4/2014 |
| WO | WO-2014/123212 A1 | 8/2014 |
| WO | WO-2017/150265 A1 | 9/2017 |

OTHER PUBLICATIONS

Written Opinion dated Jun. 11, 2019 for corresponding International Patent Application No. PCT/JP2019/015395.

* cited by examiner

[Figure 1]
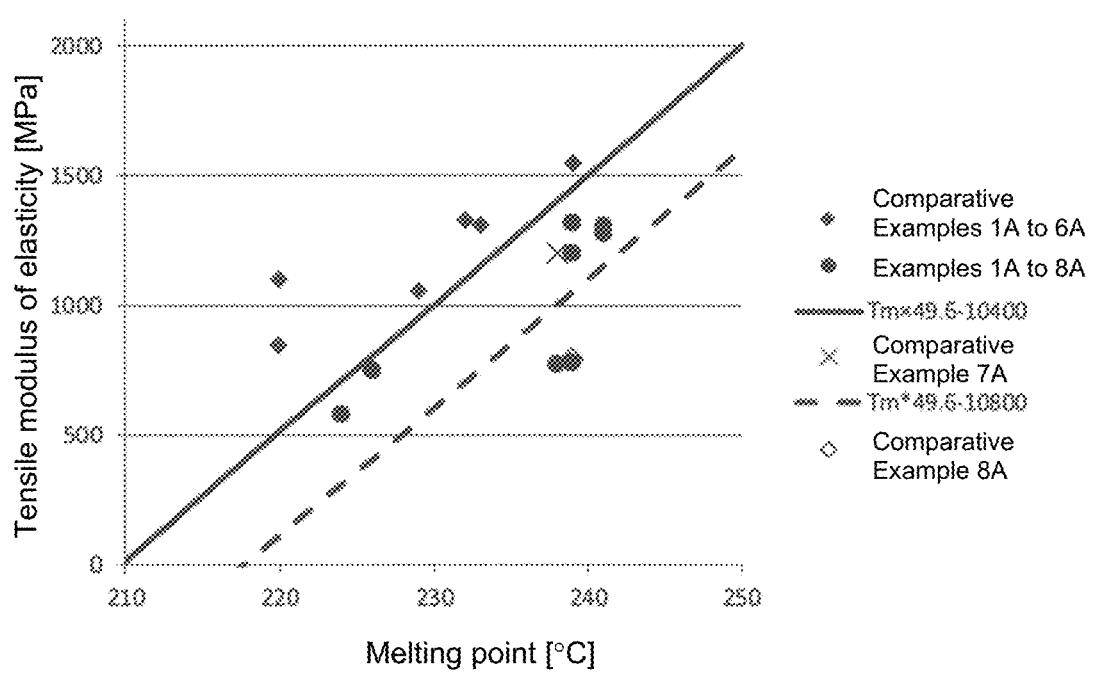

[Figure 2]
Example 1A
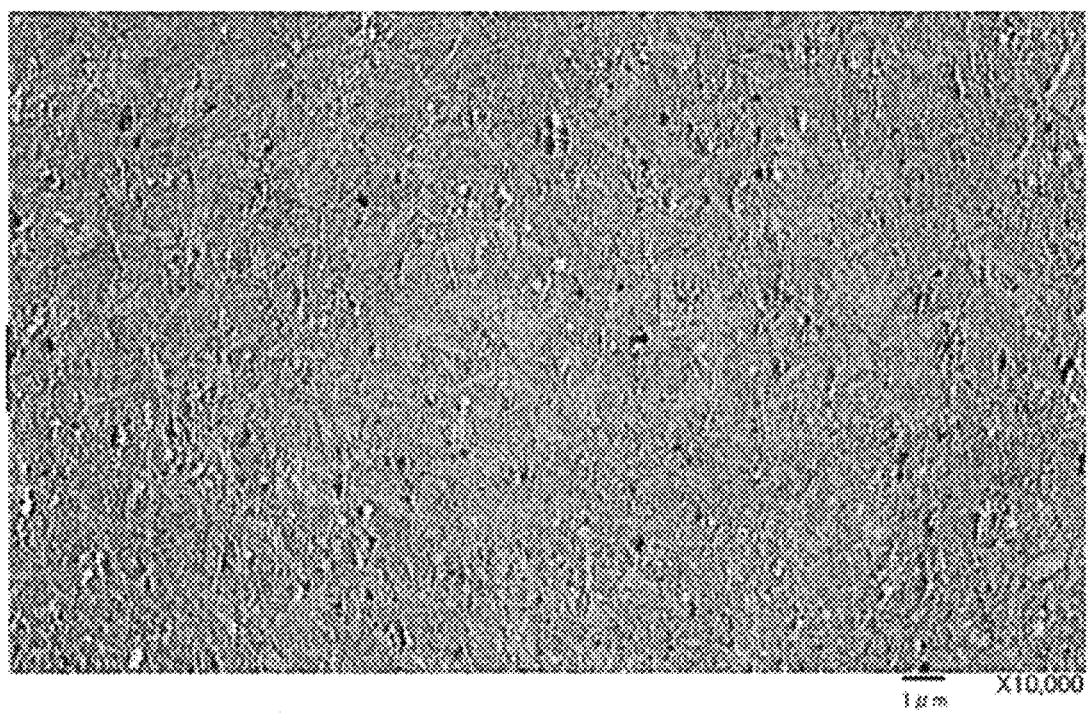

[Figure 3]
Example 2A
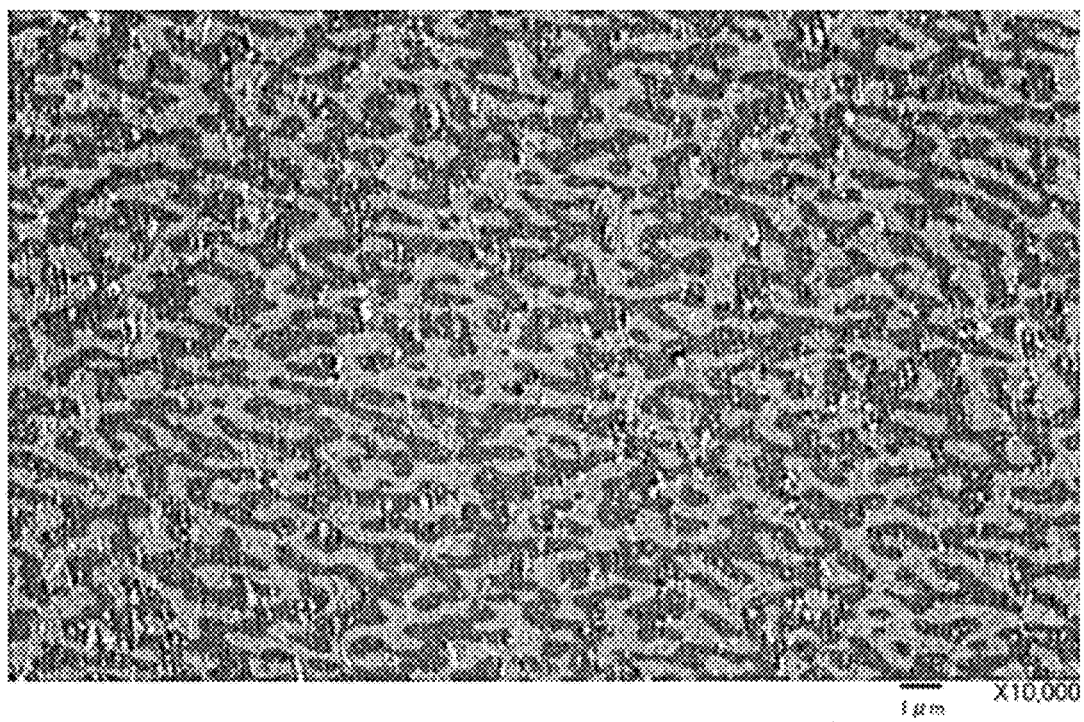

[Figure 4]
Example 3A
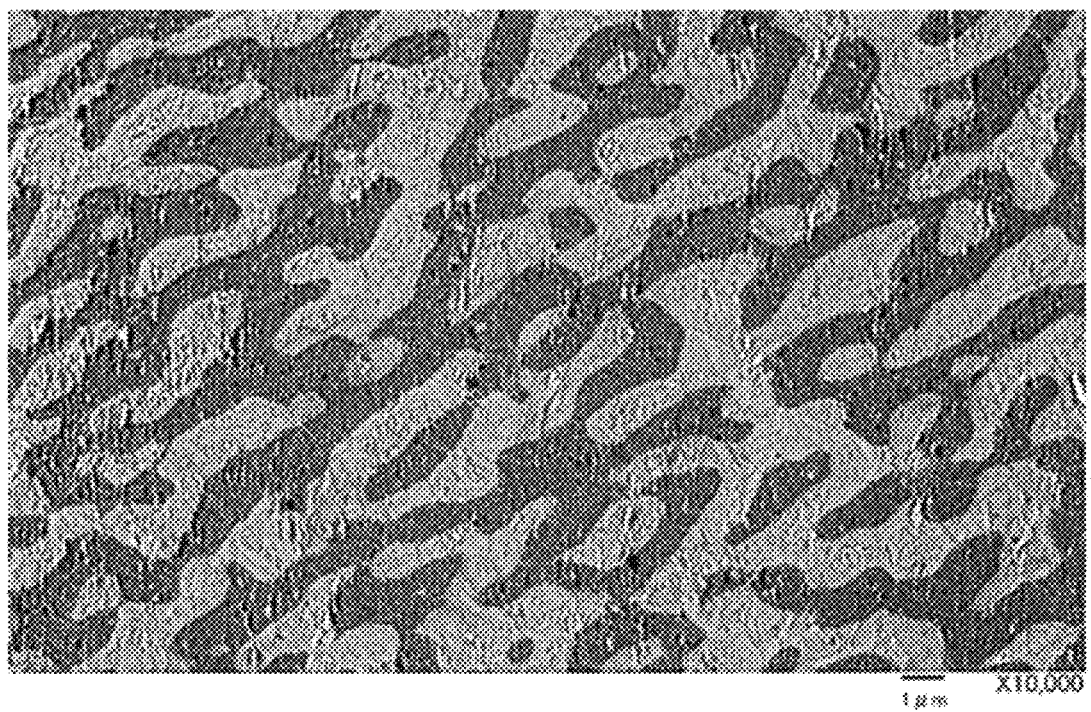

[Figure 5]
Comparative Example 8A
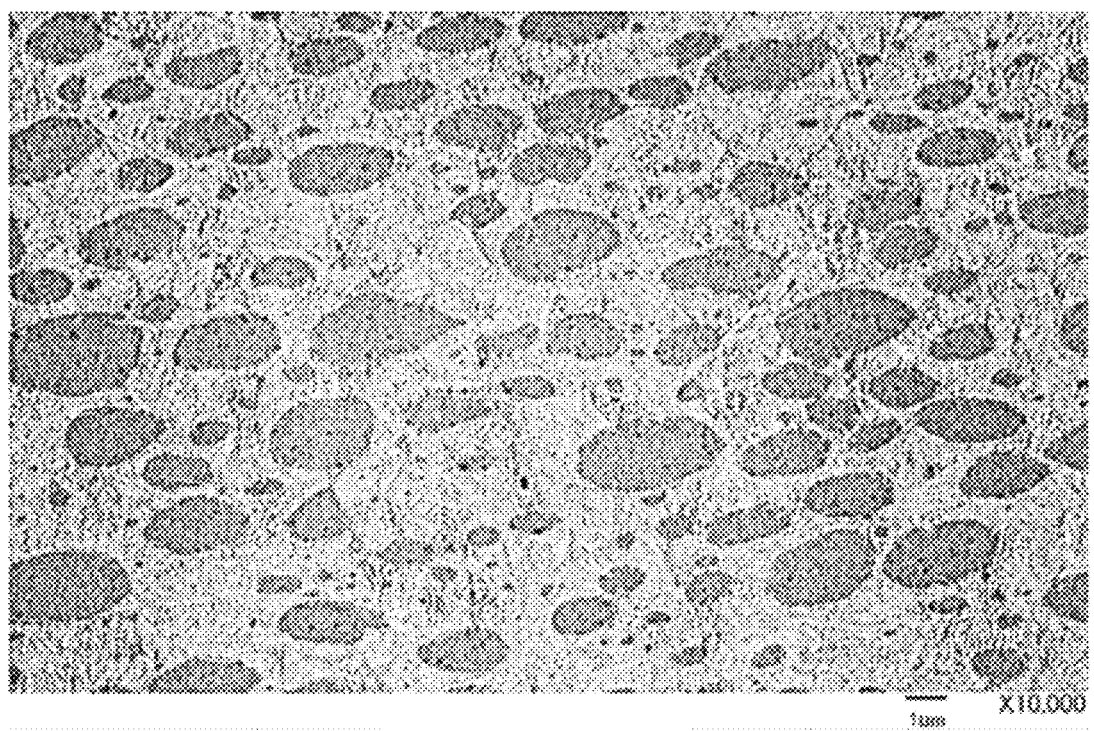

4-METHYL-1-PENTENE POLYMER PARTICLE AND METHOD FOR PRODUCING 4-METHYL-1-PENTENE RESIN

RELATED APPLICATIONS

The present application claims priority under 37 U.S.C. § 371 to International Patent Application No. PCT/JP2019/015395, filed Apr. 9, 2019, which claims priority to and the benefit of Japanese Patent Application Nos. 2018-076025 and 2018-076026, both filed on Apr. 11, 2018. The contents of these applications are hereby incorporated by reference in their entireties.

TECHNICAL FIELD

The present invention relates to a 4-methyl-1-pentene polymer particle and a method for producing a 4-methyl-1-pentene resin.

BACKGROUND ART

4-Methyl-1-pentene/α-olefin copolymers with 4-methyl-1-pentene as a main constitutional monomer are excellent in heat resistance, mold release properties, and chemical resistance and therefore widely used for various purposes. For example, films made of the copolymers are used in FPC mold releasing films, mold releasing films for composite material molding, etc. by exploiting features such as favorable mold release properties, or used in experimental instruments and mandrels for rubber hose production, etc. by exploiting features such as chemical resistance, water resistance, and transparency.

On the other hand, molded articles made of resin compositions comprising a conventional 4-methyl-1-pentene polymer may need to be less rigid and flexible in spite of having a high melting point. For example, their applications in transfer or release sheets for artificial leather production may need to have both of a high melting point for withstanding curing temperatures and flexibility for preventing cracks upon deep embossing. Patent Documents 1 and 2 disclose a 4-methyl-1-pentene polymer having high stereoregularity and a high heat of fusion and having excellent heat resistance.

4-Methyl-1-pentene copolymers can be produced by polymerization methods such as a solution polymerization method, a slurry polymerization method, and a vapor-phase polymerization method. The solution polymerization needs to separate a reaction solvent by heating for recovering a 4-methyl-1-pentene copolymer from a polymerization solution after polymerization, whereas the slurry polymerization can recover a 4-methyl-1-pentene copolymer by just a solid-liquid separation of a solid from slurry. Therefore, the slurry polymerization method is a production method advantageous in cost.

Patent Documents 3 to 5 disclose a method for copolymerizing 4-methyl-1-pentene and another α-olefin by two stages using a Ziegler catalyst. Patent Document 6 discloses a method for copolymerizing 4-methyl-1-pentene and another α-olefin at varying ratios using a Ziegler catalyst.

Patent Document 1 discloses a 4-methyl-1-pentene polymer having high stereoregularity and a high heat of fusion which is obtained using a specific metallocene catalyst. Patent Document 2 discloses a 4-methyl-1-pentene polymer having high stereoregularity and a wide molecular weight distribution which is obtained using a similar metallocene catalyst as above.

CITATION LIST

Patent Documents

Patent Document 1: WO 2014/050817
Patent Document 2: WO 2017/150265
Patent Document 3: JP S63-63707 A
Patent Document 4: JP H05-271341 A
Patent Document 5: JP H06-184240 A
Patent Document 6: JP 2006-291020 A

SUMMARY OF INVENTION

Technical Problem

As mentioned above, features of 4-methyl-1-pentene polymers and molded articles described in Patent Documents 1 to 2 are to have high stereoregularity and a high heat of fusion and to be excellent in heat resistance. The present inventors have conducted studies on a 4-methyl-1-pentene polymer that can produce a molded article having low rigidity, i.e., excellent flexibility, without largely impairing such high stereoregularity and excellent heat resistance.

Specifically, a first object of the present invention is to reduce the rigidity, i.e., to improve the flexibility, of a 4-methyl-1-pentene polymer without impairing characteristics such as high stereoregularity and excellent heat resistance.

According to the studies of the present inventors, for example, when the content of a constitutional unit derived from a comonomer other than 4-methyl-1-pentene is high in a method for producing a 4-methyl-1-pentene resin by slurry polymerization, a resulting slurry does not have favorable solid-liquid separability due to a large amount of a solvent-soluble portion in a polymer.

Specifically, a second object of the present invention is to provide a method that permits wider selection of a comonomer copolymerization ratio range of contained copolymer components while securing favorable solid-liquid separability of the resulting slurry in a method for producing a 4-methyl-1-pentene resin by slurry polymerization.

Solution to Problem

The present inventors have conducted diligent studies to attain the first object. As a result, the present inventors have completed a first aspect of the present invention by finding that the first object can be attained by a 4-methyl-1-pentene polymer particle having specific composition and having specific characteristics.

The present inventors have conducted diligent studies to attain the second object. As a result, the present inventors have completed a second aspect of the present invention by finding that the second object can be attained by a method for producing a 4-methyl-1-pentene resin (X) as described below.

The first and second aspects of the present invention relate to, for example, the following [1] to [16].

[1] A 4-methyl-1-pentene polymer particle (X) which satisfies the following requirements (X-a), (X-b) and (X-c):

(X-a) being composed of a 4-methyl-1-pentene polymer which has a content of a constitutional unit derived from 4-methyl-1-pentene being 30.0 to 99.7% by mol and which has a content of a constitutional unit derived from at least one olefin selected from ethylene and an α-olefin having 3 to 20 carbon atoms (except for 4-methyl-1-pentene) being 0.3 to 70.0% by mol;

(X-b) having, when measured in a cross fractionation chromatograph apparatus (CFC) using an infrared spectrophotometer as a detector part, at least one peak A of an amount of a component eluted present in the range of 100 to 140° C., and at least one peak B of an amount of a component eluted present at lower than 100° C.; and (X-c) having a meso diad fraction (m) measured by $^{13}$C-NMR falling within the range of 95.0 to 100%.

[2] The 4-methyl-1-pentene polymer particle (X) according to [1], containing 10.0 to 95.0 parts by mass of a 4-methyl-1-pentene polymer (x1) which satisfies the following requirement (x1-a), and 5.0 to 90.0 parts by mass of a 4-methyl-1-pentene copolymer (x2) which satisfies the following requirement (x2-a) (provided that a total amount of the polymer (x1) and the copolymer (x2) is 100 parts by mass):

(x1-a) having a content of a constitutional unit derived from 4-methyl-1-pentene being 80.0 to 100% by mol, and a content of a constitutional unit derived from at least one olefin selected from ethylene and an α-olefin having 3 to 20 carbon atoms (except for 4-methyl-1-pentene) being 0 to 20.0% by mol; and (x2-a) having a content of a constitutional unit derived from 4-methyl-1-pentene being 20.0 to 98.0% by mol, and a content of a constitutional unit derived from at least one olefin selected from ethylene and an α-olefin having 3 to 20 carbon atoms (except for 4-methyl-1-pentene) being 2.0 to 80.0% by mol and being larger than the content of the constitutional unit derived from at least one olefin selected from ethylene and an α-olefin having 3 to 20 carbon atoms (except for 4-methyl-1-pentene) in the polymer (x1).

[3] The 4-methyl-1-pentene polymer particle (X) according to [2], wherein the polymer (x1) has an intrinsic viscosity [η] of in the range of 0.5 to 20 dl/g measured in decalin of 135° C., and a melting point (Tm) of in the range of 210 to 260° C. measured by DSC, and the copolymer (x2) has an intrinsic viscosity [η] in the range of 0.5 to 20 dl/g measured in decalin of 135° C., and a melting point (Tm) of in the range of lower than 220° C. measured by DSC, or NO detected peak indicating a melting point in DSC measurement.

[4] The 4-methyl-1-pentene polymer particle (X) according to any of [1] to [3], having an intrinsic viscosity [η] measured in decalin of 135° C. falling within the range of 0.5 to 10.0 dl/g.

[5] The 4-methyl-1-pentene polymer particle (X) according to any of [1] to [4], wherein in the requirement (X-c), the meso diad fraction (m) falls within the range of 98.0 to 100%.

[6] A resin composed of a 4-methyl-1-pentene polymer particle (X) according to any of [1] to [5].

[7] A resin composition comprising a resin according to [6].

[8] A molded article obtained by molding from a 4-methyl-1-pentene polymer particle (X) according to any of [1] to [5], a resin according to [6], or a resin composition according to [7].

[9] A method for producing a 4-methyl-1-pentene resin (X), comprising the steps of: (1) producing a 4-methyl-1-pentene polymer (x1) which satisfies the following requirement (x1-a) by slurry polymerization using a metallocene catalyst; and (2) producing a 4-methyl-1-pentene copolymer (x2) which satisfies the following requirement (x2-a) by slurry polymerization using a metallocene catalyst in the presence of the polymer (x1) obtained in the step (1) such that an amount of the copolymer (x2) falls within the range of 5.0 to 90.0 parts by mass with respect to 100 parts by mass in total of the polymer (x1) and the copolymer (x2):

(x1-a) having a content of a constitutional unit derived from 4-methyl-1-pentene being 80.0 to 100% by mol, and a content of a constitutional unit derived from at least one olefin selected from ethylene and an α-olefin having 3 to 20 carbon atoms (except for 4-methyl-1-pentene) being 0 to 20.0% by mol; and (x2-a) having a content of a constitutional unit derived from 4-methyl-1-pentene being 20.0 to 98.0% by mol, and a content of a constitutional unit derived from at least one olefin selected from ethylene and an α-olefin having 3 to 20 carbon atoms (except for 4-methyl-1-pentene) being 2.0 to 80.0% by mol and being larger than the content of the constitutional unit derived from at least one olefin selected from ethylene and an α-olefin having 3 to 20 carbon atoms (except for 4-methyl-1-pentene) in the polymer (x1).

[10] The method for producing a 4-methyl-1-pentene resin (X) according to [9], wherein the polymer (x1) has an intrinsic viscosity [η] of in the range of 0.5 to 20 dl/g measured in decalin of 135° C., and a melting point (Tm) of in the range of 210 to 260° C. measured by DSC, and the copolymer (x2) has an intrinsic viscosity [η] of in the range of 0.5 to 20 dl/g measured in decalin of 135° C., and a melting point (Tm) of in the range of lower than 220° C. measured by DSC, or NO detected peak indicating a melting point in DSC measurement.

[11] The method for producing a 4-methyl-1-pentene resin (X) according to [9] or [10], wherein a temperature at which the polymerization in the step (1) and a temperature at which the polymerization in the step (2) each independently fall within the range of 0 to 100° C.

[12] The method for producing a 4-methyl-1-pentene resin (X) according to any of [9] to [11], wherein the metallocene catalyst comprises a metallocene compound (A) and is a catalyst in the form of particles having D50 of volume statistics of in the range of 1 to 500 μm.

[13] The method for producing a 4-methyl-1-pentene resin (X) according to any of [9] to [12], wherein the metallocene catalyst comprises a metallocene compound (A) and a support (B), and the support (B) is a support in the form of particles comprising 20% by mass or more of an aluminum atom and having D50 of volume statistics in the range of 1 to 500 μm.

[14] A 4-methyl-1-pentene resin (X) obtained by the method for producing a 4-methyl-1-pentene resin (X) according to any of [9] to [13].

[15] A resin composition comprising the 4-methyl-1-pentene resin (X) according to [14].

[16] A molded article obtained by molding from the 4-methyl-1-pentene resin (X) according to [14] or the resin composition according to [7].

Advantageous Effects of Invention

The first aspect of the present invention can provide a 4-methyl-1-pentene polymer particle that can produce a molded article having low rigidity while retaining high stereoregularity and excellent heat resistance, a resin, a resin composition and a molded article.

The second aspect of the present invention can provide a method for producing a 4-methyl-1-pentene resin (X) by which the resulting slurry has favorable solid-liquid separability in a method for producing a 4-methyl-1-pentene resin by slurry polymerization. Particularly, a method for producing a 4-methyl-1-pentene resin can be provided which is capable of producing a 4-methyl-1-pentene resin in a region where slurry polymerization is difficult by conventional production methods, the resin comprising copolymer components with a high content of a constitutional unit derived from a comonomer other than 4-methyl-1-pentene.

BRIEF DESCRIPTION OF DRAWINGS

FIG. 1 is a diagram showing a plot of a tensile modulus of elasticity (MPa) against a melting point (° C.) as to polymers obtained in Examples and Comparative Examples.

FIG. 2 is a transmission electron microscope (TEM) image in Example 1A.

FIG. 3 is a transmission electron microscope (TEM) image in Example 2A.

FIG. 4 is a transmission electron microscope (TEM) image in Example 3A.

FIG. 5 is a transmission electron microscope (TEM) image in Comparative Example 8A.

DESCRIPTION OF EMBODIMENTS

Hereinafter, specific embodiments of the present invention will be described in detail. However, the present invention is not limited by the embodiments given below by any means, and can be carried out by appropriately making various changes or modifications therein without departing from the objects of the present Invention.

In the present specification, the term "polymer" is used in a meaning including a homopolymer and a copolymer. Thus, for example, a 4-methyl-1-pentene polymer (x1) mentioned later may be a 4-methyl-1-pentene homopolymer or may be a 4-methyl-1-pentene copolymer. Likewise, the term "polymerization" is used in a meaning including homopolymerization and copolymerization.

4-Methyl-1-Pentene Polymer Particle (X)

4-methyl-1-pentene polymer particle (X) (also simply referred to as the "particle (X)") of the first aspect of the present invention (hereinafter, also referred to as "aspect 1") satisfies requirements (X-a), (X-b) and (X-c) described below.

<Requirement (X-a)>

(X-a) Being composed of a 4-methyl-1-pentene polymer which has a content of a constitutional unit derived from 4-methyl-1-pentene being 30.0 to 99.7% by mol and which has a content of a constitutional unit derived from at least one olefin selected from ethylene and an α-olefin having 3 to 20 carbon atoms (except for 4-methyl-1-pentene) being 0.3 to 70.0% by mol.

The content of the constitutional unit derived from 4-methyl-1-pentene is preferably 40.0 to 99.5% by mol, more preferably 50.0 to 99.0% by mol, further preferably 70.0 to 97.0% by mol, 75.0 to 96.0% by mol, or 80.0 to 95.0% by mol. The content of the constitutional unit derived from at least one olefin selected from ethylene and an α-olefin having 3 to 20 carbon atoms (except for 4-methyl-1-pentene) is preferably 0.5 to 60.0% by mol, more preferably 1.0 to 50.0% by mol, further preferably 3.0 to 30.0% by mol, 4.0 to 25.0% by mol, or 5.0 to 20.0% by mol.

Examples of the olefin include ethylene, propylene, 1-butene, 1-hexene, 1-heptene, 1-octene, 1-decene, 1-tetradecene, 1-hexadecene, 1-heptadecene, 1-octadecene, and 1-eicosene. The olefin can be appropriately selected according to the purpose and necessary physical properties of the particle (X). For example, the olefin is preferably an α-olefin having 8 to 18 carbon atoms, more preferably at least one selected from 1-octene, 1-decene, 1-tetradecene, 1-hexadecene, 1-heptadecene and 1-octadecene, from the viewpoint of conferring a moderate modulus of elasticity and excellent flexibility, bendability and stretchability. When the number of carbon atoms of the olefin falls within the range described above, a resulting resin or resin composition has more favorable stretchability and as a result, tends to be unlikely to have poor appearance ascribable to cracks or breaking at an end portion upon release from a roll or a mold at the time of molding.

The 4-methyl-1-pentene polymer may have a constitutional unit other than the constitutional unit derived from 4-methyl-1-pentene and the constitutional unit derived from the olefin (hereinafter, also referred to as an "additional constitutional unit"), without impairing the advantageous effects of the present invention. The content of the additional constitutional unit is, for example, 0 to 10.0% by mol.

Examples of the monomer from which the additional constitutional unit is derived include cyclic olefins, aromatic vinyl compounds, conjugated dienes, unconjugated polyenes, functional vinyl compounds, hydroxy group-containing olefins, and halogenated olefins. For example, compounds described in the paragraphs [0035] to [0041] of JP 2013-169685 A can be used as the cyclic olefins, the aromatic vinyl compounds, the conjugated dienes, the unconjugated polyenes, the functional vinyl compounds, the hydroxy group-containing olefins and the halogenated olefins.

When the 4-methyl-1-pentene polymer has the additional constitutional unit, only one additional constitutional unit may be contained therein, or two or more additional constitutional units may be contained therein.

<Requirement (X-b)>

(X-b) Having, when measured in a cross fractionation chromatograph apparatus (CFC) using an infrared spectrophotometer as a detector part, at least one peak A of an amount of a component eluted present in the range of 100 to 140° C., and at least one peak B of an amount of a component eluted present at lower than 100° C., preferably in the range of 0° C. or higher and lower than 100° C. The peak A may be unimodal or multimodal. The peak B may be unimodal or multimodal.

The polymer particle having the peaks A and B of the amounts of components eluted that are present in the respective ranges described above is excellently used because a resulting molded article has low rigidity (high flexibility) while retaining high heat resistance.

For example, in a method for producing the particle (X) mentioned later, the peak A is derived from a polymer (x1) produced in step (1), and the peak B is derived from a copolymer (x2) produced in step (2).

In the CFC measurement, the cumulative mass percentage of components eluted at 0° C. or lower is preferably less than 2.0% by mass, more preferably 1.5% by mass or less, further preferably 1.0% by mass or less, particularly preferably 0.5% by mass or less.

A low cumulative mass percentage of components eluted at 0° C. or lower indicates a low amount of a low-molecular-weight polymer contained in the polymer particle (X). When the cumulative mass percentage falls within the range described above, the efflux of a low-molecular-weight component serving as a contaminant component from a molded article obtained from a resin composition comprising the polymer can be suppressed. Therefore, stain on a molding machine such as a die during molding, discoloration of a resulting molded product, and molded product surface stain or content stain can be effectively suppressed. For use as a mold releasing film or a protecting film, reduction in the amount of a substance transferred from the film to a base material is expected. In the present invention, the cumulative mass percentage can be adjusted by the type of a metallocene catalyst mentioned later.

<Requirement (X-c)>

(X-c) Having a meso diad fraction (m) measured by $^{13}$C-NMR falling within the range of 95.0 to 100%. The meso diad fraction (m) falls within the range of preferably 96.0 to 100%, more preferably 97.0 to 100%, further preferably 98.0 to 100%, particularly preferably 98.5 to 100%. The upper limit value is preferably 100% and may be 99.9%. Within this range, fish eyes or poor appearance ascribable to gum is unlikely to occur during molding of the particle (X) and a resin or a resin composition obtained therefrom. This is presumably due to improved uniformity of a composition distribution by a narrow melting point distribution.

<Other Requirements>

The particle (X) has an intrinsic viscosity [η] measured in decalin of 135° C. falling within the range of preferably 0.5 to 10.0 dl/g, more preferably 0.5 to 5.0 dl/g, further preferably 1.0 to 5.0 dl/g.

The intrinsic viscosity [η] of the particle (X) can be adjusted by, for example, the respective [η] values of a polymer (x1) and a copolymer (x2) mentioned later, and the content ratio therebetween.

The particle size (D50) of the particle (X) falls within the range of usually 10 to 2000 μm, preferably 30 to 1000 μm, more preferably 50 to 500 μm, further preferably 70 to 300 μm. In one embodiment, the particle size (D50) of the particle (X) falls within the range of preferably 30 to 1800 μm, more preferably 50 to 1500 μm, further preferably 70 to 1200 μm.

The particle size (D50) is specifically a value measured using a laser diffraction/scattering apparatus manufactured by Beckman Coulter, Inc. (LS13320), and decane can be used as a dispersion medium for samples.

The particle (X) has a bulk density falling within the range of usually 0.1 to 1.0 g/cm$^3$, preferably 0.2 to 0.8 g/cm$^3$, more preferably 0.3 to 0.5 g/cm$^3$.

The particle (X) of aspect 1 refers to a state that retains the shape of a polymer particle obtained by polymer production performed in a polymerization reaction vessel, and is usually a polymer particle obtained by slurry polymerization mentioned later. More specifically, the particle (X) of aspect 1 refers to a polymer particle that has not been treated at too high a temperature to retain the shape of the polymer particle. In short, the particle (X) of aspect 1 means a polymer particle that has not been treated at, for example, a temperature of 260° C. or higher, preferably a temperature of 250° C. or higher, more preferably 240° C. or higher, further preferably 200° C. or higher, particularly preferably 150° C. or higher, especially preferably a temperature of higher than 100° C. Specifically, for example, resin pellets obtained by melt-kneading the polymer particle do not fall into the particle (X) of aspect 1. Alternatively, warming in a state that retains the shape of the polymer particle, for example, at lower than the temperature described above, is acceptable for the purpose of, for example, drying off a solvent or the like after the completion of polymerization reaction.

Detailed conditions for measuring these requirements will be described in Examples.

<Polymer Component Contained in 4-Methyl-1-Pentene Polymer Particle (X)>

The particle (X) preferably contains 10.0 to 95.0 parts by mass of a 4-methyl-1-pentene polymer (x1) which satisfies the following requirement (x1-a), and 5.0 to 90.0 parts by mass of a 4-methyl-1-pentene copolymer (x2) which satisfies the following requirement (x2-a). However, the total amount of the polymer (x1) and the copolymer (x2) is 100 parts by mass. The particle (X) usually contains the polymer (x1) and the copolymer (x2) in one particle.

The amount of the polymer (x1) is preferably 20.0 to 90.0 parts by mass, more preferably 30.0 to 85.0 parts by mass. The amount of the copolymer (x2) is preferably 10.0 to 80.0 parts by mass, more preferably 15.0 to 70.0 parts by mass. However, the total amount of the polymer (x1) and the copolymer (x2) is 100 parts by mass.

<4-Methyl-1-Pentene Polymer (x1)>

The 4-methyl-1-pentene polymer (x1) (also simply referred to as the "polymer (x1)") satisfies the following requirement (x1-a).

(x1-a) Having a content of a constitutional unit derived from 4-methyl-1-pentene being 80.0 to 100% by mol, preferably 85.0 to 100% by mol, more preferably 90.0 to 100% by mol, further preferably 95.0 to 100% by mol, and a content of a constitutional unit derived from at least one olefin (hereinafter, also referred to as "comonomer 1") selected from ethylene and an α-olefin having 3 to 20 carbon atoms (except for 4-methyl-1-pentene) being 0 to 20.0% by mol, preferably 0 to 15.0% by mol, more preferably 0 to 10.0% by mol, further preferably 0 to 5.0% by mol.

The contents of the constitutional units are based on 100% by mol in total of all repeat constitutional units.

Examples of the comonomer 1 include ethylene, propylene, 1-butene, 1-hexene, 1-heptene, 1-octene, 1-decene, 1-tetradecene, 1-hexadecene, 1-heptadecene, 1-octadecene, and 1-eicosene. The comonomer 1 can be appropriately selected according to the purpose and necessary physical properties of the particle (X) or a resin (X) obtained by the production method of the second aspect of the present invention mentioned later. For example, the comonomer 1 is preferably an α-olefin having 8 to 18 carbon atoms, more preferably at least one selected from 1-octene, 1-decene, 1-tetradecene, 1-hexadecene, 1-heptadecene and 1-octadecene, from the viewpoint of conferring a moderate modulus of elasticity and excellent flexibility, bendability and stretchability. When the number of carbon atoms of the comonomer 1 falls within the range described above, a resulting resin or resin composition has more favorable stretchability and as a result, tends to be unlikely to have poor appearance ascribable to cracks or breaking at an end portion upon release from a roll or a mold at the time of molding.

When the polymer (x1) has the constitutional unit derived from the comonomer 1, only one constitutional unit may be contained therein, or two or more constitutional units may be contained therein.

The polymer (x1) may have a constitutional unit derived from additional monomer 1 other than 4-methyl-1-pentene and the comonomer 1 (hereinafter, also referred to as "additional constitutional unit 1"), without impairing the advantageous effects of the present invention. The content of the additional constitutional unit 1 is, for example, 0 to 10.0% by mol.

Examples of the additional monomer 1 include cyclic olefins, aromatic vinyl compounds, conjugated dienes, unconjugated polyenes, functional vinyl compounds, hydroxy group-containing olefins, and halogenated olefins. For example, compounds described in the paragraphs [0035] to [0041] of JP 2013-169685 A can be used as the cyclic olefins, the aromatic vinyl compounds, the conjugated dienes, the unconjugated polyenes, the functional vinyl compounds, the hydroxy group-containing olefins and the halogenated olefins.

When the polymer (x1) has the additional constitutional unit 1, only one additional constitutional unit 1 may be contained therein, or two or more additional constitutional units 1 may be contained therein.

The 4-methyl-1-pentene polymer (x1) preferably further satisfies at least one requirement for physical properties selected from physical properties ([η] and melting point) described below.

The polymer (x1) has an intrinsic viscosity [η] measured in decalin of 135° C. falling within the range of preferably 0.5 to 20 dl/g, more preferably 0.5 to 5.0 dl/g.

The polymer (x1) has a melting point (Tm) measured with a differential scanning calorimeter (DSC) falling within the range of preferably 210 to 260° C., more preferably 220 to 260° C., further preferably 225 to 260° C. When the melting point of the polymer (x1) falls within the range described above, the resulting particle (X) is excellent in heat resistance. In the case of carrying out slurry polymerization in the second aspect of the present invention mentioned later, when the melting point of the polymer (x1) falls within the range described above, there is a tendency to be excellent in slurry properties, excellent in solid-liquid separability, and excellent in the heat resistance of the resulting resin (X).

Detailed methods for measuring the configuration, the physical properties, etc. described above will be described in Examples. In the case of carrying out slurry polymerization in the second aspect of the present invention mentioned later, the configuration, the physical properties, etc. described above are based on a polymer particle obtained by filtering off slurry.

<4-Methyl-1-Pentene Copolymer (x2)>

The 4-methyl-1-pentene copolymer (x2) (also simply referred to as the "copolymer (x2)") satisfies the following requirements (x2-a).

(x2-a) Having a content of a constitutional unit derived from 4-methyl-1-pentene being 20.0 to 98.0% by mol, preferably 25.0 to 95.0% by mol, more preferably 30.0 to 95.0% by mol, further preferably 30.0 to 92.0% by mol, particularly preferably 30.0 to 90.0% by mol, and a content of a constitutional unit derived from at least one olefin (hereinafter, also referred to as "comonomer 2") selected from ethylene and an α-olefin having 3 to 20 carbon atoms (except for 4-methyl-1-pentene) being 2.0 to 80.0% by mol, preferably 5.0 to 75.0% by mol, more preferably 5.0 to 70.0% by mol, further preferably 8.0 to 70.0% by mol, particularly preferably 10.0 to 70.0% by mol. However, the content (% by mol) of the constitutional unit derived from the comonomer 2 in the copolymer (x2) is larger than the content (% by mol) of the constitutional unit derived from the comonomer 1 in the polymer (x1).

The contents of the constitutional units are based on 100% by mol in total of all repeat constitutional units.

Examples of the comonomer 2 include the olefins listed as examples of the comonomer 1 in the requirement (x1-a). The comonomer 2 can be appropriately selected according to the purpose and necessary physical properties of the particle (X) or a resin (X) obtained by the production method of the second aspect of the present invention mentioned later. For example, the comonomer 2 is preferably an α-olefin having 8 to 18 carbon atoms, more preferably at least one selected from 1-octene, 1-decene, 1-tetradecene, 1-hexadecene, 1-heptadecene and 1-octadecene, from the viewpoint of conferring a moderate modulus of elasticity and excellent flexibility, bendability and stretchability. When the number of carbon atoms of the comonomer 2 falls within the range described above, a resulting resin or resin composition has more favorable stretchability and as a result, tends to be unlikely to have poor appearance ascribable to cracks or breaking at an end portion upon release from a roll or a mold at the time of molding.

The copolymer (x2) may contain only one constitutional unit derived from the comonomer 2 or may contain two or more constitutional units derived from the comonomer 2. When the polymer (x1) has the constitutional unit derived from the comonomer 1, the comonomer 1 of the polymer (x1) and the comonomer 2 of the copolymer (x2) may be the same or different.

The copolymer (x2) may have a constitutional unit derived from additional monomer 2 other than 4-methyl-1-pentene and the comonomer 2 (hereinafter, also referred to as "additional constitutional unit 2"), without impairing the advantageous effects of the present invention. The content of the additional constitutional unit 2 is, for example, 0 to 10.0% by mol.

Examples of the additional monomer 2 include the compounds listed as examples of the additional monomer 1 in the polymer (x1). When the copolymer (x2) has the additional constitutional unit 2, only one additional constitutional unit 2 may be contained therein, or two or more additional constitutional units 2 may be contained therein.

The 4-methyl-1-pentene copolymer (x2) preferably further satisfies at least one requirement for physical properties selected from physical properties ([η] and melting point) described below.

The copolymer (x2) has an intrinsic viscosity [η] measured in decalin of 135° C. falling within the range of preferably 0.5 to 20 dl/g, more preferably 1.0 to 7.0 dl/g.

The copolymer (x2) has a melting point (Tm) measured with a differential scanning calorimeter (DSC) falling within the range of preferably lower than 220° C., or NO detected peak indicating a melting point in DSC measurement. More preferably, the melting point (Tm) falls within the range of lower than 210° C., or NO peak indicating a melting point is detected in DSC measurement. Further preferably, the melting point (Tm) falls within the range of 120 to 200° C., or NO peak indicating a melting point is detected in DSC measurement. Particularly preferably, the melting point (Tm) falls within the range of 130 to 180° C., or NO peak indicating a melting point is detected in DSC measurement. Such a mode is preferred because a resulting 4-methyl-1-pentene polymer has a high content of the constitutional unit derived from the comonomer.

Detailed methods for measuring the configuration, the physical properties, etc. described above will be described in Examples. In the case of carrying out slurry polymerization in the second aspect of the present invention mentioned later, the configuration, the physical properties, etc. described above are based on a polymer particle obtained by filtering off slurry. The content, [η] and Tm of the constitutional unit of the copolymer (x2) can be calculated from measurement results about the polymer (x1) and the particle (X) (or a resin (X) obtained by the production method of the second aspect of the present invention), and the mass ratio between the polymer (x1) and the copolymer (x2).

[Method for Producing 4-Methyl-1-Pentene Polymer Resin (X)]

The method for producing a 4-methyl-1-pentene resin (X) (also simply referred to as a "resin (X)") according to the second aspect of the present invention (hereinafter, also referred to as "aspect 2") comprises the steps of: (1) producing a 4-methyl-1-pentene polymer (x1) which satisfies the requirement (x1-a) by slurry polymerization using a metallocene catalyst; and (2) producing a 4-methyl-1-pentene copolymer (x2) which satisfies the requirement (x2-a) by slurry polymerization using a metallocene catalyst in the presence of the polymer (x1) obtained in the step (1) such that an amount of the copolymer (x2) falls within the range of 5.0 to 90.0 parts by mass with respect to 100 parts by mass in total of the polymer (x1) and the copolymer (x2).

The 4-methyl-1-pentene polymer particle (X) of the first aspect of the present invention can be produced by, for example, a production method comprising the steps of: (1) producing the polymer (x1), preferably by slurry polymerization using a metallocene catalyst; and (2) producing the copolymer (x2), preferably by slurry polymerization using a metallocene catalyst in the presence of the polymer (x1) obtained in the step (1) such that an amount of the copolymer (x2) falls within the range of 5.0 to 90.0 parts by mass with respect to 100 parts by mass in total of the polymer (x1) and the copolymer (x2).

Specifically, the production method has the step (1) and the step (2) differing in polymerization conditions, and may involve two-stage polymerization of the steps (1) and (2) or may involve three-stage or more polymerization including another step in addition to the steps (1) and (2).

<Step (1)>

In the step (1), a 4-methyl-1-pentene polymer (x1) which satisfies the requirement (x1-a) is produced by slurry polymerization. In the step (1), the polymerization is usually performed using a metallocene catalyst.

The polymer (x1) is described in detail in the section <4-Methyl-1-pentene polymer (x1)>, including the requirement (x1-a) and suitable modes and monomer species.

In the case of using comonomer 1 in the step (1), the ratio between the amounts of 4-methyl-1-pentene and the comonomer 1 supplied is set such that the contents of the respective constitutional units derived therefrom fall within the ranges described above, and also differs depending on the reactivity of the comonomer 1. For example, the ratio between the amounts supplied, 4-methyl-1-pentene/comonomer 1 (molar ratio), falls within the range of 100/0 to 80/20, preferably 100/0 to 90/10, more preferably 100/0 to 95/5, further preferably 100/0 to 97/3, particularly preferably 100/0 to 98/2 and is a range that permits slurry polymerization.

In the step (1), slurry containing the polymer (x1) is obtained. The slurry concentration, i.e., the polymer (x1) particle concentration, is usually 0.015 to 45% by mass, preferably 0.03 to 35% by mass. The slurry concentration can be calculated by, for example, filtration by a method described in Examples.

<Step (2)>

In the step (2), a 4-methyl-1-pentene copolymer (x2) which satisfies the requirement (x2-a) is produced by slurry polymerization in the presence of the polymer (x1) obtained in the step (1). In the step (2), the polymerization is usually performed using a metallocene catalyst.

The copolymer (x2) is described in detail in the section <4-Methyl-1-pentene copolymer (x2)>, including the requirement (x2-a) and suitable modes and monomer species.

In the step (2), the ratio between the amounts of 4-methyl-1-pentene and the comonomer 2 supplied is set such that the contents of the respective constitutional units derived therefrom fall within the ranges described above, and also differs depending on the reactivity of the comonomer 2. For example, the ratio between the amounts supplied, 4-methyl-1-pentene/comonomer 2 (molar ratio), falls within the range of 0/100 to 98/2, preferably 20/80 to 98/2, more preferably 30/70 to 95/5, further preferably 30/70 to 92/8, particularly preferably 30/70 to 90/10.

When 4-methyl-1-pentene (monomer) remains after the polymerization in the step (1), a 4-methyl-1-pentene copolymer can be obtained without supplying 4-methyl-1-pentene (monomer) in the step (2).

In the step (2), the copolymer (x2) is produced such that the amount of the copolymer (x2) falls within the range of 5.0 to 90.0 parts by mass, preferably 10.0 to 80.0 parts by mass, further preferably 15.0 to 70.0 parts by mass, with respect to 100 parts by mass in total of the polymer (x1) obtained in the step (1) and the copolymer (x2) obtained in the step (2). The production of these polymers at such a quantitative ratio is preferred because a resulting 4-methyl-1-pentene polymer has a high content of the constitutional unit derived from the comonomer (the comonomer 1 and the comonomer 2 are collectively referred to as the comonomer).

The production of the copolymer (x2) in the step (2) after the production of the polymer (x1) in the step (1) achieves slurry polymerization in each of the steps as compared with the case where production in reverse order easily ends up with solution polymerization.

In the step (2), the amounts of 4-methyl-1-pentene and the comonomer 2 supplied are selected such that the quantitative ratio between the polymer (x1) and the copolymer (x2) falls within the range described above.

In one embodiment, in the step (2), 4-methyl-1-pentene and the comonomer 2 can be added to the slurry containing the polymer (x1) to perform the slurry polymerization of these monomers. When 4-methyl-1-pentene added in the step (1) remains, 4-methyl-1-pentene may not be added.

In the step (2), a resin (X) containing the polymer (x1) and the copolymer (x2) or slurry containing the particle (X) is obtained. The slurry concentration, i.e., the resin (X) particle concentration or the particle (X) concentration, is usually 3 to 50% by mass, preferably 5 to 40% by mass. The slurry concentration can be calculated by, for example, filtration by a method described in Examples.

<<Polymerization Conditions>>

The polymerization conditions in the steps (1) and (2) will be described below.

Examples of the polymerization solvent include hydrocarbon media and specifically include: aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride, chlorobenzene, and dichloromethane; and mixtures of two or more selected therefrom. Alternatively, the olefin itself, such as 4-methyl-1-pentene or any of other α-olefins, may be used as the polymerization solvent. Thus, in the present invention, olefin polymerization can be performed in the hydrocarbon medium and/or with the olefin itself, for use in polymerization, as a medium.

The production method adopts slurry polymerization. The "slurry polymerization" refers to polymerization wherein a polymer resulting from polymerization is present without being substantially dissolved in the medium used in the polymerization, for example, in a form dispersed as fine particles in the medium.

In the steps (1) and (2), the olefin polymerization temperature is usually 0 to 100° C., preferably 20 to 70° C.; and the polymerization pressure is usually ordinary pressure to a gauge pressure of 10 MPa, preferably ordinary pressure to a gauge pressure of 5 MPa. The polymerization reaction can be performed by any of batch, semicontinuous, and continuous methods. These conditions of the steps (1) and (2) may be the same or different.

Particularly, hydrogen may be effective for improving the polymerization activity of a catalyst that can be used in olefin polymerization or effective for increasing or decreasing the molecular weight of a polymer, and is thus a preferred additive. In the case of adding hydrogen into the system, the amount of hydrogen is appropriately on the order of 0.00001 to 100 NL per mol of the olefin. The hydrogen concentration in the system can be adjusted by adjusting the amount of hydrogen supplied as well as by a method of performing hydrogen production or consumption reaction in the system, a method of separating hydrogen through the use of a membrane, or partial release of a gas containing hydrogen from the system.

The molecular weight of a resulting polymer can be adjusted by allowing hydrogen to be present in the polymerization system or changing the polymerization temperature as to each of the step (1) and the step (2). Alternatively, the molecular weight of the polymer may be adjusted by difference in support (B) mentioned later that can constitute the metallocene catalyst, or the adjustment of the 4-methyl-1-pentene concentration in the polymerization solvent.

In one embodiment, in the steps (1) and (2), the amount of a solvent-soluble portion (SP) of the polymer in a resulting slurry is adjusted to preferably 10% by mass or less, more preferably 5% by mass or less. When the amount of SP falls within the range described above, solid-liquid separability is excellent. A larger ratio of the amount of the comonomer 1 supplied in the step (1) or the comonomer 2 supplied in the step (2) tends to increase the amount of SP. The amount of SP can be adjusted to the range described above by using a suitable metallocene catalyst. For example, use of a metallocene catalyst comprising a preferred metallocene compound (the general formula [A1], further preferably the general formula [A2]) mentioned later suppresses the formation of the solvent-soluble portion (SP) and facilitates adjusting the amount of SP to the preferred range mentioned above.

<<Metallocene Catalyst>>

In the steps (1) and (2), each of the polymer (x1) and the copolymer (x2) is preferably produced using a metallocene catalyst. Use of the metallocene catalyst compared with use of a Ziegler catalyst decreases the amount of the solvent-soluble portion of a resulting polymer and improves slurry properties. The slurry properties are favorable even when, for example, the content of the constitutional unit derived from the comonomer is large. Thus, the solvent-insoluble particle of interest can be efficiently separated and recovered from the slurry.

The metallocene catalyst comprises a metallocene compound (A).

The metallocene catalyst can further comprise a support (B).

The metallocene catalyst is preferably a catalyst in the form of particles having D50 of volume statistics in the range of 1 to 500 μm. The D50 falls within the range of more preferably 2 to 200 μm, further preferably 5 to 50 μm. The D50 of volume statistics can be determined by a laser diffraction/scattering method using, for example, MT3300EX II manufactured by MicrotracBEL Corp. The D50 of the metallocene catalyst is usually equivalent to D50 of a support (B) mentioned later, i.e., falls within the range of usually 0.90 to 1.10 times, preferably 0.95 to 1.05 times, more preferably 1.0 to 1.03 times D50 of the support (B).

<Metallocene Compound (A)>

Examples of the metallocene compound (A) include compounds disclosed in WO 2005/121192, WO 2014/050817, WO 2014/123212, and WO 2017/150265. Preferred examples thereof include bridged metallocene compounds disclosed in WO 2014/050817 and WO 2017/150265, though the scope of the present invention is not limited thereby.

The metallocene compound (A) is preferably a compound represented by the general formula [A1].

[Chem. 1]

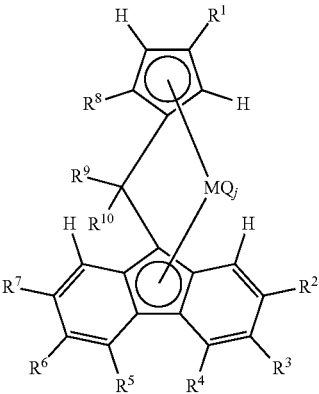

[A1]

In the formula [A1], $R^1$ represents a hydrocarbon group, a silicon-containing group or a halogen-containing hydrocarbon group. $R^2$ to $R^{10}$ are each selected from a hydrogen atom, a hydrocarbon group, a silicon-containing group, a halogen atom and a halogen-containing hydrocarbon group and may be the same with or different from each other, and the respective substituents may be bonded to each other to form a ring. M represents a transition metal atom of group 4 of the periodic table. Q is selected in the same or different combination from a halogen atom, a hydrocarbon group, a neutral conjugated or unconjugated diene having 10 or less carbon atoms, an anion ligand and a neutral ligand capable of being coordinated as a lone electron pair. j represents an integer of 1 to 4.

A complex compound that has less reduction in polymerization activity through the step (1) and the step (2), permits highly stereoregular polymerization, is excellent in the copolymerization performance of comonomers, and produces a high-molecular-weight copolymer is suitably used as a particularly preferred metallocene compound (A). The permitted highly stereoregular polymerization suppresses an eluted polymer component in slurry polymerization, and can adjust the melting point of the polymer (x1) to a range of high melting points and can adjust the heat resistance of a resulting resin so as to be high. The excellent comonomer copolymerization performance enables the copolymerization composition of the polymer (x1) and the copolymer (x2) to be freely changed and can appropriately set flexibility according to the purpose of the resin. The obtainment of the high-molecular-weight copolymer enables the molecular weight of the copolymer (x2) to be adjusted so as to be high, and achieves high strength and tenacity of a resulting resin, and is therefore preferred.

From such a viewpoint, the compound represented by the general formula [A1] is particularly preferably a compound represented by the general formula [A2] described in WO 2014-050817, etc.

[Chem. 2]

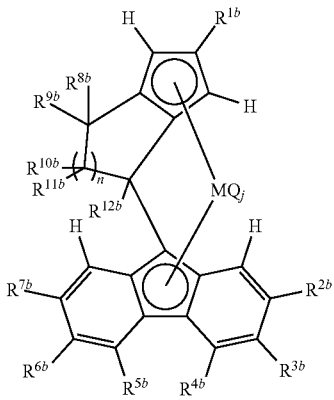

[A2]

In the formula [A2], $R^{1b}$ represents a hydrocarbon group, a silicon-containing group or a halogen-containing hydrocarbon group. $R^{2b}$ to $R^{12b}$ are each selected from a hydrogen atom, a hydrocarbon group, a silicon-containing group, a halogen atom and a halogen-containing hydrocarbon group and may be the same with or different from each other, and the respective substituents may be bonded to each other to form a ring. M represents a transition metal atom of group 4 of the periodic table. n represents an integer of 1 to 3. Q is selected in the same or different combination from a halogen atom, a hydrocarbon group, a neutral conjugated or unconjugated diene having 10 or less carbon atoms, an anion ligand and a neutral ligand capable of being coordinated as a lone electron pair. j represents an integer of 1 to 4.

($R^1$ to $R^{10}$ and $R^{1b}$ to $R^{12b}$)

Examples of the hydrocarbon group represented by each of $R^1$ to $R^{10}$ and $R^{1b}$ to $R^{12b}$ include linear hydrocarbon groups, branched hydrocarbon groups, cyclic saturated hydrocarbon groups, cyclic unsaturated hydrocarbon groups, and groups prepared by replacing one or two or more hydrogen atoms of a saturated hydrocarbon group with cyclic unsaturated hydrocarbon groups. The number of carbon atoms of the hydrocarbon group is usually 1 to 20, preferably 1 to 15, more preferably 1 to 10.

Examples of the linear hydrocarbon group include: linear alkyl groups such as a methyl group, an ethyl group, a n-propyl group, a n-butyl group, a n-pentyl group, a n-hexyl group, a n-heptyl group, a n-octyl group, a n-nonyl group, and a n-decanyl group; and linear alkenyl groups such as an allyl group.

Examples of the branched hydrocarbon group include branched alkyl groups such as an isopropyl group, a tert-butyl group, a tert-amyl group, a 3-methylpentyl group, a 1,1-diethylpropyl group, a 1,1-dimethylbutyl group, a 1-methyl-1-propylbutyl group, a 1,1-dipropylbutyl group, a 1,1-dimethyl-2-methylpropyl group, and a 1-methyl-1-isopropyl-2-methylpropyl group.

Examples of the cyclic saturated hydrocarbon group include: cycloalkyl groups such as a cyclopentyl group, a cyclohexyl group, a cycloheptyl group, a cyclooctyl group, and a methylcyclohexyl group; and polycyclic groups such as a norbornyl group, an adamantyl group, and a methyladamantyl group.

Examples of the cyclic unsaturated hydrocarbon group include: aryl groups such as a phenyl group, a tolyl group, a naphthyl group, a biphenyl group, a phenanthryl group, and an anthracenyl group; cycloalkenyl groups such as a cyclohexenyl group; and polycyclic unsaturated alicyclic groups such as a 5-bicyclo[2.2.1]hept-2-enyl group.

Examples of the group prepared by replacing one or two or more hydrogen atoms of a saturated hydrocarbon group with cyclic unsaturated hydrocarbon groups include groups prepared by replacing one or two or more hydrogen atoms of an alkyl group with aryl groups, such as a benzyl group, a cumyl group, a 1,1-diphenylethyl group, and a triphenylmethyl group.

Examples of the silicon-containing group represented by each of $R^1$ to $R^{10}$ and $R^{1b}$ to $R^{12b}$ include groups represented by the formula —$SiR_3$ (wherein a plurality of R each independently represent an alkyl group having 1 to 15 carbon atoms or a phenyl group), such as a trimethylsilyl group, a triethylsilyl group, a dimethylphenylsilyl group, a diphenylmethylsilyl group, and a triphenylsilyl group.

Examples of the halogen-containing hydrocarbon group represented by each of $R^1$ to $R^{10}$ and $R^{1b}$ to $R^{12b}$ include groups prepared by replacing one or two or more hydrogen atoms of the hydrocarbon group with halogen atoms, such as a trifluoromethyl group.

Examples of the halogen atom represented by each of $R^2$ to $R^{10}$ and $R^{2b}$ to $R^{12b}$ include a fluorine atom, a chlorine atom, a bromine atom, and an iodine atom.

Among the substituents $R^2$ to $R^{10}$ and $R^{2b}$ to $R^{12b}$, two substituents (e.g., $R^{2b}$ and $R^{3b}$, $R^{3b}$ and $R^{4b}$, $R^{5b}$ and $R^{6b}$, $R^{6b}$ and $R^{7b}$, $R^{8b}$ and $R^{9b}$, $R^{9b}$ and $R^{10b}$, $R^{10b}$ and $R^{11b}$, or $R^{11b}$ and $R^{12b}$) may be bonded to each other to form a ring, and the ring formation may be present at two or more locations in the molecule.

In the present invention, examples of the ring (spiro ring or additional ring) formed by the two substituents bonded to each other include alicyclic rings and aromatic rings. Specific examples thereof include a cyclohexane ring, a benzene ring, a hydrogenated benzene ring, and a cyclopentene ring, preferably a cyclohexane ring, a benzene ring, and a hydrogenated benzene ring. Such a ring structure may further have a substituent such as an alkyl group on the ring.

$R^{1b}$ is preferably a hydrocarbon group, more preferably a hydrocarbon group having 1 to 20 carbon atoms, further preferably a non-aryl group, especially preferably a linear hydrocarbon group, a branched hydrocarbon group or a cyclic saturated hydrocarbon group, particularly preferably a substituent having tertiary carbon as carbon having a free valency (carbon bonded to the cyclopentadienyl ring), from the viewpoint of stereoregularity.

Examples of $R^{1b}$ can specifically include a methyl group, an ethyl group, an isopropyl group, a tert-butyl group, a tert-pentyl group, a tert-amyl group, a 1-methylcyclohexyl group, and a 1-adamantyl group, more preferably substituents having tertiary carbon as carbon having a free valency, such as a tert-butyl group, a tert-pentyl group, a 1-methylcyclohexyl group, and a 1-adamantyl group, particularly preferably a tert-butyl group and a 1-adamantyl group.

In the general formula [A2], the fluorene ring moiety is not particularly limited as long as the structure is obtained from a fluorene derivative known in the art. Each of Rob and $R^{5b}$ is preferably a hydrogen atom from the viewpoint of stereoregularity and a molecular weight.

Each of $R^{2b}$, $R^{3b}$, $R^{6b}$ and $R^{7b}$ is preferably a hydrogen atom or a hydrocarbon group, more preferably a hydrocarbon group, further preferably a hydrocarbon group having 1 to 20 carbon atoms. Alternatively, $R^{2b}$ and $R^{3b}$ may be bonded to each other to form a ring, and $R^{6b}$ and $R^{7b}$ may be bonded to each other to form a ring. Examples of such a substituted fluorenyl group include a benzofluorenyl group, a dibenzofluorenyl group, a octahydrodibenzofluorenyl group, a 1,1,4,4,7,7,10,10-octamethyl-2,3,4,7,8,9,10,12-octahydro-1H-dibenzo[b,h]fluorenyl group, a 1,1,3,3,6,6,8,8-octamethyl-2,3,6,7,8,10-hexahydro-1H-dicyclopenta[b,h]fluorenyl group, and a 1',1',3',6',8',8'-hexamethyl-1'H,8'H-dicyclopenta[b,h]fluorenyl group, particularly preferably a 1,1,4,4,7,7,10,10-octamethyl-2,3,4,7,8,9,10,12-octahydro-1H-dibenzo[b,h]fluorenyl group.

$R^{8b}$ is preferably a hydrogen atom.

$R^{9b}$ is more preferably a hydrocarbon group. $R^{9b}$ is further preferably an alkyl group having two or more carbon atoms such as a linear alkyl group or a branched alkyl group, a cycloalkyl group or a cycloalkenyl group. $R^{9b}$ is especially preferably an alkyl group having two or more carbon atoms. Each of $R^{10b}$ and $R^{11b}$ is also preferably a hydrogen atom from the viewpoint of synthesis.

Alternatively, in the case of n=1, $R^{9b}$ and $R^{10b}$ are more preferably bonded to each other to form a ring. Particularly preferably, the ring is a 6-membered ring such as a cyclohexane ring. In this case, $R^{11b}$ is preferably a hydrogen atom.

$R^{12b}$ is preferably a hydrocarbon group, particularly preferably an alkyl group.

(M, Q, n and j)

M is a transition metal atom of group 4 of the periodic table and is, for example, Ti, Zr or Hf, preferably Zr or Hf, particularly preferably Zr.

Q represents a halogen atom, a hydrocarbon group, a neutral conjugated or unconjugated diene having 10 or less carbon atoms, an anion ligand or a neutral ligand capable of being coordinated as a lone electron pair.

Examples of the halogen atom represented by Q include fluorine, chlorine, bromine, and iodine.

The hydrocarbon group represented by Q is preferably an alkyl group having 1 to 10 carbon atoms or a cycloalkyl group having 3 to 10 carbon atoms. Examples of the alkyl group having 1 to 10 carbon atoms include a methyl group, an ethyl group, a n-propyl group, an iso-propyl group, a 2-methylpropyl group, a 1,1-dimethylpropyl group, a 2,2-dimethylpropyl group, a 1,1-diethylpropyl group, a 1-ethyl-1-methylpropyl group, a 1,1,2,2-tetramethylpropyl group, a sec-butyl group, a tert-butyl group, a 1,1-dimethylbutyl group, a 1,1,3-trimethylbutyl group, and a neopentyl group; and examples of the cycloalkyl group having 3 to 10 carbon atoms include a cyclohexylmethyl group, a cyclohexyl group, and a 1-methyl-1-cyclohexyl group. The number of carbon atoms of the hydrocarbon group is more preferably 5 or less.

Examples of the neutral conjugated or unconjugated diene having 10 or less carbon atoms include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, and s-cis- or s-trans-$\eta^4$-1,4-bis(trimethylsilyl)-1,3-butadiene.

Examples of the anion ligand include: alkoxy groups such as methoxy and tert-butoxy; aryloxy groups such as phenoxy; carboxylate groups such as acetate and benzoate; and sulfonate groups such as mesylate and tosylate.

Examples of the neutral ligand capable of being coordinated as a lone electron pair include: organophosphorus compounds such as trimethylphosphine, triethylphosphine, triphenylphosphine, and diphenylmethylphosphine; and ethers such as tetrahydrofuran (THF), diethyl ether, dioxane, and 1,2-dimethoxyethane.

A preferred form of Q is a halogen atom or an alkyl group having 1 to 5 carbon atoms.

n is an integer of 1 to 3, preferably 1 or 2, more preferably 1. The value described above as n is preferred from the viewpoint of efficiently obtaining a product polymer.

j is an integer of 1 to 4, preferably 2.

Preferred modes are described above about the configuration of the compound represented by the general formula [A1] or [A2], i.e., $R^1$ to $R^{10}$, $R^{1b}$ to $R^{12b}$, M, n, Q and j. In the present invention, arbitrary combinations of respective preferred modes are also included in the preferred modes. Such a bridged metallocene compound can be suitably used for obtaining the polymer having the physical properties described above.

The compound represented by the general formula [A2] is particularly preferably (8-octamethylfluoren-12'-yl-(2-(adamantan-1-yl)-8-methyl-3,3b,4,5,6,7,7a,8-octahydrocyclopenta[a]indene))zirconium dichloride or (8-(2,3,6,7-tetramethylfluoren)-12'-yl-(2-(adamantan-1-yl)-8-methyl-3,3b,4,5,6,7,7a,8-octahydrocyclopenta[a]indene))zirconium dichloride. In this context, the octamethylfluorene refers to 1,1,4,4,7,7,10,10-octamethyl-2,3,4,7,8,9,10,12-octahydro-1H-dibenzo[b,h]fluorene.

<Support (B)>

The support (B) is preferably in the form of particles and forms the metallocene catalyst by immobilizing the metallocene compound (A) on the surface or in the inside thereof. The catalyst in such a form is generally called metallocene-supported catalyst.

The support (B) is composed mainly of an organoaluminum compound (B–1), an organoboron compound (B–2), or an inorganic compound (B–3), or a complex of two or more selected therefrom.

Examples of the organoaluminum compound (B–1) include: trialkyl aluminums such as trimethyl aluminum, triethyl aluminum, triisobutyl aluminum, and tri-n-octyl aluminum; dialkyl aluminum hydrides such as diisobutyl aluminum hydride; tricycloalkyl aluminums; and organoaluminum oxy compounds typified by aluminoxane. Examples of the organoaluminum compound (B–1) can also include organoaluminum oxy compounds containing a boron atom, aluminoxane containing halogen as listed in WO 2005/066191 and WO 2007/131010, and ionic aluminoxane as listed in WO 2003/082879.

Examples of the organoboron compound (B–2) include triethyl ammonium tetraphenylborate, tripropyl ammonium tetraphenylborate, tri(n-butyl) ammonium tetraphenylborate, trimethyl ammonium tetrakis(p-tolyl)borate, trimethyl ammonium tetrakis(o-tolyl)borate, tri(n-butyl) ammonium tetrakis(pentafluorophenyl)borate, triethyl ammonium tetrakis(pentafluorophenyl)borate, tripropyl ammonium tetrakis(pentafluorophenyl)borate, tripropyl ammonium tetrakis(2,4-dimethylphenyl)borate, tri(n-butyl) ammonium tetrakis(3,5-dimethylphenyl)borate, tri(n-butyl) ammonium tetrakis(4-trifluoromethylphenyl)borate, tri(n-butyl) ammonium tetrakis(3,5-ditrifluoromethylphenyl)borate, tri(n-butyl) ammonium tetrakis(o-tolyl)borate, dioctadecylmethyl ammonium tetraphenylborate, dioctadecylmethyl ammonium tetrakis(p-tolyl)borate, dioctadecylmethyl ammonium tetrakis(o-tolyl)borate, dioctadecylmethyl ammonium tetrakis(pentafluorophenyl)borate, dioctadecylmethyl ammonium tetrakis(2,4-dimethylphenyl)borate, dioctadecylmethyl ammonium tetrakis(3,5-dimethylphenyl)borate, dioctadecylmethyl ammonium tetrakis(4-trifluoromethylphenyl)borate, dioctadecylmethyl ammonium tetrakis(3,5-ditrifluoromethylphenyl)borate, dioctadecylmethyl ammonium, N,N-dimethylanilinium tetraphenylborate, N,N- dimethylanilinium tetrakis(pentafluorophenyl)borate, N,N-dimethylanilinium tetrakis(3,5-ditrifluoromethylphenyl)borate, N,N-diethylanilinium tetraphenylborate, N,N-diethylanilinium tetrakis(pentafluorophenyl)borate, N,N-diethylanilinium tetrakis(3,5-ditrifluoromethylphenyl)borate, N,N-2,4,6-pentamethylanilinium tetraphenylborate, and N,N-2,4,6-pentamethylanilinium tetrakis(pentafluorophenyl)borate.

Examples of the inorganic compound (B-3) include porous oxides, inorganic halides, clays, clay minerals, and ion-exchange lamellar compounds.

Examples of the porous oxide include oxides such as $SiO_2$, $Al_2O_3$, MgO, $ZrO_2$, $TiO_2$, $B_2O_3$, CaO, ZnO, BaO, and $ThO_2$, and complexes or mixtures containing these. Examples thereof can include natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$, and $SiO_2$—$TiO_2$—MgO.

Examples of the inorganic halide include $MgCl_2$, $MgBr_2$, $MnCl_2$, and $MnBr_2$. The inorganic halide may be used as it is or may be used after being crushed using a ball mill or a vibrating mill. Alternatively, the inorganic halide may be dissolved in a solvent such as an alcohol and then precipitated into fine particles, using a precipitating agent, for use.

The clay is usually composed mainly of a clay mineral. The ion-exchange lamellar compound is a compound having a crystal structure where constitutional surfaces are parallelly stacked with each other through weak bonding force by ionic bond or the like, and ions contained therein are exchangeable. A great majority of clay minerals are ion-exchange lamellar compounds. Not only a natural product but an artificially synthesized product can be used as such a clay, a clay mineral, or an ion-exchange lamellar compound. Examples of the clay, the clay mineral or the ion-exchange lamellar compound can include clays, clay minerals, and ionic crystalline compounds having a lamellar crystal structure such as hexagonal close-packed type, antimony type, $CdCl_2$ type, or $CdI_2$ type.

The clay or the clay mineral is also preferably chemically treated. Any of surface treatment of removing impurities attached to surface, treatment that influences the crystal structure of the clay, and the like can be used as the chemical treatment. Specific examples of the chemical treatment include acid treatment, alkali treatment, salt treatment, and organic matter treatment.

The support (B) used in the present invention is preferably a support containing an aluminum atom, from the viewpoint of high activity and further reduction in the amount of a solvent-soluble portion. The content of the aluminum atom in the support (B) is preferably 20% by mass or more, more preferably 20 to 60% by mass, further preferably 30 to 50% by mass, particularly preferably 35 to 47% by mass.

The D50 of volume statistics of the support (B) is preferably 1 to 500 μm, more preferably 2 to 200 μm, further preferably 5 to 50 μm. The D50 of volume statistics can be determined by a laser diffraction/scattering method using, for example, MT3300EX II manufactured by MicrotracBEL Corp.

Solid aluminoxane is suitably used as such a support (B). For example, solid aluminoxane disclosed in WO 2010/055652, WO 2013/146337, or WO 2014-123212 is particularly suitably used.

The term "solid" means that the aluminoxane substantially maintains a solid state in a reaction environment where the solid aluminoxane is used. More specifically, this term means that, for example, when an olefin polymerization solid catalyst component is prepared by contacting respective components constituting the olefin polymerization catalyst, the aluminoxane is in a solid state in an environment having a specific temperature and pressure in an inert hydrocarbon medium such as hexane or toluene for use in the reaction.

The solid aluminoxane preferably contains aluminoxane having at least one constitutional unit selected from a constitutional unit represented by the formula (1) and a constitutional unit represented by the formula (2), more preferably contains aluminoxane having a constitutional unit represented by the formula (1), and further preferably contains polymethylaluminoxane consisting of a constitutional unit represented by the formula (1).

[Chem. 3]

In the formula (1), Me represents a methyl group.

In the formula (2), $R^1$ is a hydrocarbon group having 2 to 20 carbon atoms, preferably a hydrocarbon group having 2 to 15 carbon atoms, more preferably a hydrocarbon group having 2 to 10 carbon atoms. Examples of the hydrocarbon group include: alkyl groups such as ethyl, propyl, n-butyl, pentyl, hexyl, octyl, decyl, isopropyl, isobutyl, sec-butyl, tert-butyl, 2-methylbutyl, 3-methylbutyl, 2-methylpentyl, 3-methylpentyl, 4-methylpentyl, 2-methylhexyl, 3-methylhexyl, and 2-ethylhexyl; cycloalkyl groups such as cyclohexyl and cyclooctyl; and aryl groups such as phenyl and tolyl.

The structure of the solid aluminoxane has not been completely revealed and is presumed to usually have a configuration with approximately 2 to 50 repeats of the constitutional units represented by the formula (1) and/or the formula (2), though not limited by the configuration. The binding pattern of the constitutional units varies and is, for example, a linear pattern, a cyclic pattern, or a clustered pattern. The aluminoxane is presumed to usually consist of one of these or be a mixture thereof. Alternatively, the aluminoxane may consist of the constitutional unit represented by the formula (1) or the formula (2).

The solid aluminoxane is preferably solid polymethylaluminoxane, more preferably solid polymethylaluminoxane consisting of the constitutional unit represented by the formula (1).

The solid aluminoxane is usually in the form of particles having D50 of volume statistics of preferably 1 to 500 μm, more preferably 2 to 200 μm, further preferably 5 to 50 μm. The D50 of volume statistics can be determined by a laser diffraction/scattering method using, for example, MT3300EX II manufactured by MicrotracBEL Corp.

The specific surface area of the solid aluminoxane is preferably 100 to 1000 $m^2/g$, more preferably 300 to 800 $m^2/g$. The specific surface area can be determined through the use of the adsorption and desorption phenomena of a gas on solid surface according to a BET adsorption isotherm.

The solid aluminoxane functions as a catalyst support. Hence, for example, a solid inorganic support such as silica, alumina, silica-alumina, or magnesium chloride, or a solid organic support such as polystyrene beads need not be used as a catalyst support in addition to the solid aluminoxane.

The solid aluminoxane can be prepared by, for example, a method described in WO 2010/055652 and WO 2014/123212.

<Organic Compound Component (C)>

The metallocene catalyst may further contain an organic compound component (C), if necessary. The organic compound component (C) is used, if necessary, for the purpose of improving polymerization performance and the physical properties of a product polymer. The organoaluminum compound (B-1) mentioned above may be used as the organic compound component (C). Other examples thereof include alcohols, phenolic compounds, carboxylic acids, phosphorus compounds, amides, polyethers and sulfonates.

<Method for Using Each Component and Order of Addition>

For the olefin polymerization, the method for using each component and the order of addition are arbitrarily selected. Examples thereof include methods as described below. Hereinafter, the metallocene compound (A), the support (B) and the organic compound component (C) are also referred to as "components (A), (B) and (C)", respectively.

(i) A method of adding the component (A) and the component (B) in an arbitrary order to a polymerization vessel.

(ii) A method of adding a catalyst component comprising the component (A) supported by the component (B) to a polymerization vessel.

In each of the methods (i) and (ii), the component (C) may be further added at an arbitrary stage. Also, at least two catalyst components may be contacted in advance.

In the solid catalyst component comprising the component (A) supported by the component (B), an olefin such as 4-methyl-1-pentene or 3-methyl-1-pentene may be prepolymerized. A catalyst component may be further supported on the prepolymerized solid catalyst component.

In the present invention, the metallocene catalyst is prepared from the metallocene compound (A), the support (B), and optionally an additional component, and olefins including 4-methyl-1-pentene are preferably polymerized, i.e., the steps (1) and (2) are preferably performed, in the presence of this catalyst. The phrase "olefins including 4-methyl-1-pentene are polymerized in the presence of the metallocene catalyst" encompasses a mode in which, as in each of the methods, each component constituting the metallocene catalyst is added to a polymerization vessel by an arbitrary method to perform olefin polymerization.

For polymerizing olefins using the metallocene catalyst in the steps (1) and (2), the amount of each component used capable of constituting the metallocene catalyst is as described below. In the metallocene catalyst, the content of each component can be adjusted as described below.

The component (A) is usually used in an amount of $10^{-10}$ to $10^{-2}$ mol, preferably $10^{-2}$ to $10^{-3}$ mol, per L of reaction volume. The component (B-1) can be used in an amount of usually 10 to 10000, preferably 30 to 2000, particularly preferably 150 to 500, in terms of the molar ratio of the aluminum atom in the component (B-1) to the total transition metal atom (M) in the component (A) [Al/M]. The component (B-2) can be used in an amount of usually 10 to 10000, preferably 30 to 2000, further preferably 150 to 500, in terms of the molar ratio of the component (B-2) to the total transition metal atom (M) in the component (A) [(B-2)/M]. The component (B-3) can be used in an amount of usually 10 to 10000, preferably 30 to 2000, further preferably 150 to 500, in terms of the molar ratio of the component (B-3) to the total transition metal atom (M) in the component (A) [(B-3)/M].

In the case of using the component (C), the component (C) can be used in an amount of usually 0.002 to 500, preferably 0.01 to 60, in terms of the molar ratio of the aluminum atom in the component (B-1) to the component (C) [Al/(C)] when the component (B) is the component (B-1), in an amount of usually 0.002 to 500, preferably 0.01 to 60, in terms of the molar ratio of the component (B-2) to the component (C) [(B-2)/(C)] when the component (B) is the component (B-2), and in an amount of usually 0.002 to 500, preferably 0.01 to 60, in terms of the molar ratio of the component (B-3) to the component (C) [(B-3)/(C)] when the component (B) is the component (B-3).

<Solid-Liquid Separation Step>

The resin (X) or the particle (X) can be separated and recovered by the solid-liquid separation, for example, filtration, of the resin (X) containing the polymer (x1) and the copolymer (x2) or the slurry containing the particle (X), obtained in the step (2). The resin (X) or the particle (X) can be efficiently recovered by this solid-liquid separation step.

<Work-Up Step>

The 4-methyl-1-pentene resin (X) or the 4-methyl-1-pentene polymer particle (X) obtained by the production method described above, for example, the resin (X) particle or the particle (X) obtained by the solid-liquid separation step, may be subjected, if necessary, to a work-up step known in the art such as a catalyst deactivation treatment step, a catalyst residue removal step, or a drying step after production by the method.

[4-Methyl-1-Pentene Resin (X)]

The 4-methyl-1-pentene resin (X) obtained by the production method of aspect 2 will be described.

The resin (X) contains usually 10.0 to 95.0 parts by mass, preferably 20.0 to 90.0 parts by mass, more preferably 30.0 to 85.0 parts by mass, of the 4-methyl-1-pentene polymer (x1), and contains usually 5.0 to 90.0 parts by mass, preferably 10.0 to 80.0 parts by mass, more preferably 15.0 to 70.0 parts by mass, of the 4-methyl-1-pentene copolymer (x2). However, the total amount of the polymer (x1) and the copolymer (x2) is 100 parts by mass.

In the resin (X), the content of the constitutional unit derived from 4-methyl-1-pentene is preferably 30.0 to 99.7% by mol, more preferably 40.0 to 99.5% by mol, further preferably 50.0 to 99.0% by mol, particularly preferably, 70.0 to 97.0% by mol, 75.0 to 96.0% by mol, or 80.0 to 95.0% by mol.

In the resin (X), the content of the constitutional unit derived from at least one olefin selected from ethylene and an α-olefin having 3 to 20 carbon atoms (except for 4-methyl-1-pentene) is preferably 0.3 to 70.0% by mol, more preferably 0.5 to 60.0% by mol, further preferably 1.0 to 50.0% by mol, particularly preferably, 3.0 to 30.0% by mol, 4.0 to 25.0% by mol, or 5.0 to 20.0% by mol.

The resin (X) may have the additional constitutional units 1 and 2 (additional constitutional unit) mentioned above, without impairing the advantageous effects of the present invention. The content of the additional constitutional unit is, for example, 0 to 10.0% by mol.

The resin (X) has an intrinsic viscosity [η] measured in decalin of 135° C. falling within the range of preferably 0.5 to 10.0 dl/g, more preferably 0.5 to 5.0 dl/g, further preferably 1.0 to 5.0 dl/g.

The intrinsic viscosity [η] of the resin (X) can be adjusted by the respective [η] values of the polymer (x1) and the copolymer (x2), and the content ratio therebetween.

The meso diad fraction (m) of the resin (X) measured by $^{13}$C-NMR falls within the range of preferably 95.0 to 100%, more preferably 96.0 to 100%, further preferably 97.0 to 100%, particularly preferably 98.0 to 100%, most preferably 98.5 to 100%. The upper limit value is preferably 100% and may be 99.9%. The m can be adjusted to the range described above by using a suitable metallocene catalyst. For example, use of the metallocene catalyst comprising the preferred metallocene compound (the general formula [A1], further preferably the general formula [A2]) mentioned above facilitates adjusting the m to the range described above. The m that falls within the range described above is preferred because the slurry has favorable solid-liquid separability.

The resin (X) obtained by the production method of aspect 2 is, for example, a particle. The resin (X) is, for example, the particle (X) of aspect 1. The particle composed of the resin (X) has a particle size (D50) falling within the range of usually 10 to 2000 μm, preferably 30 to 1000 μm, more preferably 50 to 500 μm, further preferably 70 to 300 μm. In one embodiment, the particle composed of the resin (X) has a particle size (D50) falling within the range of preferably 30 to 1800 μm, more preferably 50 to 1500 μm, further preferably 70 to 1200 μm.

The particle size (D50) is specifically a value measured using a laser diffraction/scattering apparatus manufactured by Beckman Coulter, Inc. (LS13320), and decane can be used as a dispersion medium for samples. The particle size (D50) of the particle composed of the resin (X) is usually larger than the particle size (D50) of the metallocene catalyst.

The particle composed of the resin (X) has a bulk density falling within the range of usually 0.1 to 1.0 g/cm$^3$, preferably 0.2 to 0.8 g/cm$^3$, more preferably 0.3 to 0.5 g/cm$^3$.

The resin (X) obtained by the production method of the present invention may be pelletized. Examples of the pelletization method include the following methods (1) and (2).
(1) A method of mechanically blending the resin (X) and an additional component added if desired using an extruder, a kneader, or the like, and cutting a resulting blend into a predetermined size.
(2) A method of dissolving the resin (X) and an additional component added if desired in an appropriate good solvent (e.g., hydrocarbon solvents such as hexane, heptane, decane, cyclohexane, benzene, toluene and xylene), subsequently removing the solvent, then mechanically blending a resulting residue using an extruder, a kneader, or the like, and cutting a resulting blend into a predetermined size.

In one embodiment, the resin (X) obtained by the production method of aspect 2 consists of the 4-methyl-1-pentene polymer particle (X) and may be a resin obtained, for example, by melt-kneading the particle (X).

[Resin Composition Containing 4-Methyl-1-Pentene Resin (X)]

The resin composition of the present invention contains the 4-methyl-1-pentene resin (X).

The resin composition of the present invention can contain an additional component that does not fall into the resin (X), for example, a resin other than the resin (X), and various additives.

Examples of the resin other than the resin (X) include: thermoplastic resins such as thermoplastic polyolefin resins other than the resin (X), thermoplastic polyamide resins, thermoplastic polyester resins, and thermoplastic vinyl aromatic resins; and thermosetting resins such as unsaturated polyester resins, epoxy resins, phenol resins, urea resins, melamine resins, diallyl phthalate resins, and silicone resins. Specific examples of these resins will be mentioned later.

Examples of the various additives include weathering stabilizers, heat stabilizers, antioxidants, ultraviolet absorbers, antistatic agents, anti-slip agents, antiblocking agents, anti-fogging agents, nucleating agents, lubricants, pigments, dyes, antiaging agents, hydrochloric acid absorbers, inorganic or organic fillers, organic or inorganic foaming agents, cross-linking agents, cross-linking aids, pressure-sensitive adhesives, softening agents, and flame retardants.

In the resin composition of the present invention, the content of the resin (X) is usually 30% by mass or more, preferably 40% by mass or more, more preferably 50% by mass or more.

The resin composition of the present invention is obtained, for example, by mixing two or more resins (X) or by mixing the resin (X) with an additional component. Examples of the mixing method include, but are not particularly limited to, a compounding method using a twin-screw extruder, and a mixing method by dry blending.

[Resin Composed of 4-Methyl-1-Pentene Polymer Particle (X)]

The resin of the present invention is composed of the 4-methyl-1-pentene polymer particle (X) and is obtained, for example, by melt-kneading the particle (X). The melt kneading temperature falls within the range of usually 180 to 350° C., preferably 200 to 320° C., more preferably 250 to 300° C. The shape is not limited, and the form of pellets is usually preferred for handleability. In this respect, various additives mentioned later may be added, if necessary.

Examples of the pelletization method include the following methods (1) and (2).
(1) A method of melt-kneading the particle (X) and an additional component added if desired using an extruder, a kneader, or the like, and cutting a resulting melt-kneaded product into a predetermined size.
(2) A method of dissolving the particle (X) and an additional component added if desired in an appropriate good solvent (e.g., hydrocarbon solvents such as hexane, heptane, decane, cyclohexane, benzene, toluene and xylene), subsequently removing the solvent, then melt-kneading a resulting residue using an extruder, a kneader, or the like, and cutting a resulting melt-kneaded product into a predetermined size.

[Features of Resin Composed of 4-Methyl-1-Pentene Polymer Particle (X)]

Features of the resin of the present invention are to have high stereoregularity and to achieve both of excellent heat resistance and relatively low rigidity, i.e., flexibility. These features are brought about by the polymer particle (X) of the present invention. A component having a peak of the amount of a component eluted in the range of 100 to 140° C. in CFC measurement (usually the polymer (x1)) produces the characteristics of high heat resistance, and a component having a peak of the amount of a component eluted at lower than 100° C. (usually the copolymer (x2)) produces the characteristics of flexibility.

In one embodiment, the resin of the present invention can achieve excellent stain resistance. The feature of stain resistance is obtained when the cumulative mass percentage of components eluted at 0° C. or lower in CFC measurement is less than 2.0% by mass.

On the other hand, a feature of the resin of the present invention is that its haze is lower, i.e., transparency is better, than that of a resin which is a mixture of polymers obtained by each individually polymerizing the polymer (x1) and the copolymer (x2), for example, a resin obtained by melt-kneading the individual polymers. This is probably because the resin of the present invention is obtained from the particle (X) comprising both the polymer (x1) and the copolymer (x2) in one particle and therefore has uniform sizes of the polymer (x1) and the copolymer (x2) in a phase-separated structure. The phase-separated structure can be confirmed, for example, under a transmission electron microscope or by an X-ray scattering method or a light scattering method. However, when the phase-separated structure is small or when the polymer (x1) and the copolymer (x2) are highly compatible, the phase-separated structure may be unable to be observed by these methods. The phase-separated structure is not particularly limited and presumably depends on the volume ratio between the polymer (x1) and the copolymer (x2). It is considered that a bicontinuous structure or a sea-island structure is easily taken. In some cases, a lamellar structure, a cylinder structure, or the like may presumably be taken.

In one embodiment, the tensile modulus of elasticity of a molded article obtained by molding from the resin composed of the particle (X) of aspect 1, or the resin composition containing the resin preferably satisfies the following expression 1 and more preferably satisfies the following expression 2.

Tensile modulus of elasticity (MPa)<Tm (° C.)× 49.6−10400    Expression 1:

Tensile modulus of elasticity (MPa)<Tm (° C.)× 49.6−10800    Expression 2:

In this context, the tensile modulus of elasticity is a value measured in accordance with ASTM D 638, and the melting point (Tm) is a value measured with a differential scanning calorimeter (DSC) and usually corresponds to the melting point of the particle (X), the details of which will be described in Examples. The molding conditions for the molded article will be described in the section <Molding method> in Examples.

When the molded article satisfies the expression 1, the molded article can be determined to have high heat resistance and excellent flexibility. The relationship of the expression 1 is indicated by the solid line in FIG. 1. When the molded article satisfies the expression 2, the molded article can be determined to have better balance between heat resistance and flexibility. The relationship of the expression 2 is indicated by the broken line in FIG. 1. Specifically, use of the resin composed of the particle (X) of aspect 1, or the resin composition thereof can produce a molded article excellent in heat resistance and flexibility.

The 4-methyl-1-pentene polymer particle (X) of aspect 1 or the resin composed of the 4-methyl-1-pentene polymer particle (X), or the 4-methyl-1-pentene polymer constituting the 4-methyl-1-pentene resin (X) obtained by the production method of aspect 2 may be partially graft-modified with a polar monomer.

Examples of the polar monomer include hydroxy group-containing ethylenic unsaturated compounds, amino group-containing ethylenic unsaturated compounds, epoxy group-containing ethylenic unsaturated compounds, aromatic vinyl compounds, unsaturated carboxylic acids or derivatives thereof, vinyl ester compounds, vinyl chloride, vinyl group-containing organosilicon compounds, and carbodiimide compounds. The polar monomer is particularly preferably an unsaturated carboxylic acid or a derivative thereof, or a vinyl group-containing organosilicon compound.

Examples of the unsaturated carboxylic acid or the derivative thereof include unsaturated compounds having one or more carboxylic acid groups, esters of a compound having a carboxylic acid group and an alkyl alcohol, and unsaturated compounds having one or more carboxylic anhydride groups. Examples of the unsaturated group include a vinyl group, a vinylene group, and unsaturated cyclic hydrocarbon groups. These compounds are not particularly limited, and conventional compounds known in the art can be used. Specific examples thereof include: unsaturated carboxylic acids such as (meth)acrylic acid, maleic acid, fumaric acid, tetrahydrophthalic acid, itaconic acid, citraconic acid, crotonic acid, isocrotonic acid, and Nadic acid[TM] (endo-cis-bicyclo[2.2.1]hept-5-ene-2,3-dicarboxylic acid); and derivatives such as acid halides, amides, imides, anhydrides, and esters thereof. Specific examples of the derivative include methyl acrylate, methyl methacrylate, dimethyl maleate, monomethyl maleate, dimethyl fumarate, dimethyl itaconate, diethyl citraconate, dimethyl tetrahydrophthalate, dimethyl Nadicate (dimethyl endo-cis-bicyclo[2.2.1]hept-5-ene-2,3-dicarboxylate), malenyl chloride, maleimide, maleic anhydride, citraconic anhydride, and glycidyl maleate. One of these unsaturated carboxylic acids and derivatives thereof may be used alone, or two or more thereof may be used in combination. Among these, unsaturated dicarboxylic acid or an acid anhydride thereof is preferred, and, particularly, maleic acid, Nadic acid[TM] or an acid anhydride thereof is preferably used.

The vinyl group-containing organosilicon compound is not particularly limited, and a conventional compound known in the art can be used. Examples thereof include vinyltriethoxysilane, vinyltrimethoxysilane, vinyltris(β-methoxy-ethoxy)silane, γ-glycidoxypropyltrimethoxysilane, γ-aminopropyltriethoxysilane, γ-methacryloxypropyltrimethoxysilane, 2-(3,4-epoxycyclohexyl)ethyltrimethoxysilane, 3-glycidoxypropyltrimethoxysilane, 3-glycidoxypropylmethylethoxysilane, p-styryltrimethoxysilane, 3-methacryloxypropylmethyldimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-triethoxysilyl-N-(1,3-dimethyl-butylidene)propylamine, N-phenyl-3-aminopropyltrimethoxysilane, 3-ureidopropyltriethoxysilane, and 3-isocyanatopropyltriethoxysilane. Among these, γ-glycidoxypropyltrimethoxysilane, γ-aminopropyltriethoxysilane, γ-methacryloxypropyltrimethoxysilane, vinyltriethoxysilane, vinyltrimethoxysilane, and 3-acryloxypropyltrimethoxysilane are preferred, and vinyltriethoxysilane, vinyltrimethoxysilane, and 3-acryloxypropyltrimethoxysilane having small steric hindrance and high graft modification efficiency are more preferred.

One type of polar monomer may be used alone, or two or more of polar monomers may be used in combination.

The polar monomer is used in an amount of usually 1 to 100 parts by mass, preferably 5 to 80 parts by mass, with respect to 100 parts by mass of the particle (X), the resin composed of the particle (X), or the 4-methyl-1-pentene polymer constituting the resin (X).

This graft polymerization is usually performed in the presence of a radical initiator.

For example, an organic peroxide or an azo compound can be used as the radical initiator. Specifically, a conventional compound known in the art can be used. Examples thereof include: dialkyl peroxides such as dicumyl peroxide, di-t-butyl peroxide, di-t-butylperoxy-3,3,5-trimethylcyclohexane, t-butylcumyl peroxide, di-t-amyl peroxide, t-butyl hydroperoxide, 2,5-dimethyl-2,5-di(t-butylperoxy)hexyne-3, 2,5-dimethyl-2,5-di(benzoylperoxy)hexane, 2,5-dimethyl-2,5-di(t-butylperoxy)hexane, and α,α'-bis(t-butylperoxy-m-isopropyl)benzene; peroxy esters such as t-butyl peroxyacetate, t-butyl peroxyisobutyrate, t-butyl peroxypivalate, t-butyl peroxymaleate, t-butyl peroxyneodecanoate, t-butyl peroxybenzoate, and di-t-butyl peroxyphthalate; ketone peroxides such as dicyclohexanone peroxide; and mixtures thereof.

The radical initiator may be mixed directly with the 4-methyl-1-pentene polymer and the polar monomer for use, or may be used after being dissolved in a small amount of an organic solvent. This organic solvent can be used without limitations as long as the organic solvent is capable of dissolving the radical initiator.

A reducing substance may be used for graft-polymerizing the polar monomer. Use of the reducing substance can improve the amount of the polar monomer grafted.

The graft modification can be performed by a conventional method known in the art and can be performed, for example, by dissolving the 4-methyl-1-pentene polymer in an organic solvent, and subsequently adding the polar monomer and the radical initiator, etc. to the resulting solution, followed by reaction at a temperature of 60 to 260° C., preferably 80 to 200° C., for 0.5 to 15 hours, preferably 1 to 10 hours.

Alternatively, the polar monomer and the radical initiator may be added without a solvent or in the form of a solution to the particle (X) of aspect 1 or the resin composed of the particle (X), or the resin (X) obtained by the production method of aspect 2 in a solid state, and reacted therewith at a temperature of 60 to 260° C., preferably 80 to 200° C., for 0.5 to 15 hours, preferably 1 to 10 hours.

Alternatively, the 4-methyl-1-pentene polymer may be reacted with the polar monomer without a solvent using an extruder or the like for production. This reaction is preferably performed, usually at a temperature equal to or higher than the melting point of the polymer, specifically 120 to 300° C., usually for 0.5 to 10 minutes.

The amount of the 4-methyl-1-pentene polymer modified (the amount of the polar monomer grafted) obtained by the method is usually 0.1 to 50% by mass, preferably 0.2 to 30% by mass, further preferably 0.2 to 10% by mass, with respect to 100% by mass of the 4-methyl-1-pentene polymer that has been graft-modified.

In the present invention, the 4-methyl-1-pentene polymer comprising the graft-modified polymer is excellent in adhesiveness and compatibility with other resins and can improve the wettability of molded article surface. Also, the graft-modified polymer can be suitably utilized by cross-linking in cross-linked wires and cross-linked pipes.

Further, a block-graft copolymer comprising a polyolefin segment and a polar polymer segment chemically bonded to the polyolefin segment may be obtained by the atom transfer radical polymerization of a radical-polymerizable monomer using, as a macroinitiator, a halogen-modified polymer obtained by halogenating the 4-methyl-1-pentene polymer. The macroinitiator is a polymer having the ability to initiate atom transfer radical polymerization, and refers to a polymer having a site capable of serving as the point of initiation of atom transfer radical polymerization in the molecular chain.

The halogen-modified polymer is produced by reacting the 4-methyl-1-pentene polymer with a halogenating agent. The halogenating agent is not particularly limited as long as the halogenating agent can halogenate the 4-methyl-1-pentene polymer, to give a halogen-modified polymer. Specific examples thereof include chlorine, bromine, iodine, phosphorus trichloride, phosphorus tribromide, phosphorus triiodide, phosphorus pentachloride, phosphorus pentabromide, phosphorus pentaiodide, thionyl chloride, sulfuryl chloride, thionyl bromide, N-chlorosuccinimide, N-bromosuccinimide, N-bromocaprolactam, N-bromophthalimide, 1,3-dibromo-5,5-dimethylhydantoin, N-chloroglutarimide, N-bromoglutarimide, N,N'-dibromoisocyanuric acid, N-bromoacetamide, N-bromo carbamide acid ester, dioxane dibromide, phenyl trimethyl ammonium tribromide, pyridinium hydrobromide perbromide, pyrrolidone hydrotribromide, t-butyl hypochlorite, t-butyl hypobromite, copper(II) chloride, copper(II) bromide, iron(III) chloride, oxalyl chloride, and IBr. Among these, chloride, bromide, N-chlorosuccinimide, N-bromosuccinimide, N-bromocaprolactam, N-bromophthalimide, 1,3-dibromo-5,5-dimethylhydantoin, N-chloroglutarimide, N-bromoglutarimide, and N,N'-dibromoisocyanuric acid are preferred, and bromine and compounds having N—Br bond such as N-bromosuccinimide, N-bromocaprolactam, N-bromophthalimide, 1,3-dibromo-5,5-dimethylhydantoin, N-bromoglutarimide, and N,N'-dibromoisocyanuric acid are more preferred.

The reaction of the 4-methyl-1-pentene polymer with the halogenating agent is preferably performed in an inert gas atmosphere. Examples of the inert gas include inert gases such as nitrogen, argon, and helium. A solvent can also be used, if necessary, in the reaction. Any solvent that does not inhibit the reaction can be used. Examples thereof include: aromatic hydrocarbon solvents such as benzene, toluene and xylene; aliphatic hydrocarbon solvents such as pentane, hexane, heptane, octane, nonane and decane; alicyclic hydrocarbon solvents such as cyclohexane, methylcyclohexane and decahydronaphthalene; chlorinated hydrocarbon solvents such as chlorobenzene, dichlorobenzene, trichlorobenzene, methylene chloride, chloroform, carbon tetrachloride, tetrachloroethylene and tetrachloroethane; alcohol solvents such as methanol, ethanol, n-propanol, iso-propanol, n-butanol, sec-butanol and tert-butanol; ketone solvents such as acetone, methyl ethyl ketone and methyl isobutyl ketone; ester solvents such as ethyl acetate and dimethyl phthalate; and ether solvents such as dimethyl ether, diethyl ether, di-n-amyl ether, tetrahydrofuran and dioxyanisole.

In the reaction with the halogenating agent, a radical initiator may be added, if necessary, in order to accelerate the reaction. Examples of the radical initiator include the radical initiator described above.

Various conventional methods known in the art can be adopted to a method for reacting the 4-methyl-1-pentene polymer with the halogenating agent. Examples thereof include a method of suspending or dissolving the 4-methyl-1-pentene polymer in a solvent, followed by reaction, usually at a temperature of −80° C. to 250° C., preferably at a temperature equal to or higher than room temperature and equal to or lower than the boiling point of the solvent, with the halogenating agent and the radical initiator, etc. added and mixed if necessary, and a method of melt-kneading the 4-methyl-1-pentene polymer at a temperature equal to or higher than its melting point, for example, 180 to 300° C., in contact with the halogenating agent and, if necessary, the radical initiator.

The polar polymer segment is a homopolymer or a copolymer of one or more monomers selected from radical-polymerizable monomers. Examples of the radical-polymerizable monomer include: (meth)acrylic acid monomers such as (meth)acrylic acid, methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth) acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, 2-(dimethylamino)ethyl (meth)acrylate, γ-(methacryloyloxypropyl)trimethoxysilane, ethylene oxide adducts of (meth)acrylate, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadecylethyl (meth)acrylate; styrene monomers such as styrene, vinyltoluene, α-methylstyrene, chlorostyrene, styrenesulfonic acid and salts thereof; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride; maleic acid; monoalkyl esters and dialkyl esters of maleic acid; fumaric acid; monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amide group-containing vinyl monomers such as (meth)acrylamide, N-methyl(meth)acrylamide, N-ethyl(meth)acrylamide, N-propyl(meth)acrylamide, N-isopropyl(meth)acrylamide, N-butyl(meth)acrylamide, and N,N-dimethyl(meth)acrylamide; vinyl ester monomers such as vinyl acetate, vinyl propionate, vinyl pivalate, vinyl benzoate, and vinyl cinnamate; vinyl chloride; vinylidene chloride; allyl chlorides; and allyl alcohols. These organic compounds may be used alone or in combination of two or more types thereof.

The atom transfer radical polymerization can be performed by a conventional method known in the art. The polymerization method is not particularly limited, and bulk polymerization, solution polymerization, suspension polymerization, emulsion polymerization, bulk-suspension polymerization, or the like can be applied thereto. The reaction temperature can be any temperature at which radical polymerization reaction proceeds, and is usually −100° C. to 250° C., though varying depending on the desired degree of polymerization of the polymer, or the type or amount of the radical initiator and solvent used.

[Resin Composition Containing Resin Composed of 4-Methyl-1-Pentene Polymer Particle (X)]

The resin composition of the present invention contains the resin composed of the 4-methyl-1-pentene polymer particle (X).

The resin composition of the present invention can contain an additional component that does not correspond to the resin composed of the particle (X), for example, a resin other than the resin composed of the particle (X), and various additives.

Examples of the resin other than the resin include thermoplastic polyolefin resins other than the resin composed of the particle (X), for example, polyethylene, polypropylene, polybutene-1, ethylene-propylene copolymers, ethylene-butene copolymers, propylene-butene copolymers, ethylene-propylene-butene-1 copolymers, ethylene-propylene-hexene-1 copolymers, ethylene-propylene-octene-1 copolymers, ethylene-butene-1-hexene-1 copolymers, ethylene-butene-1-octene-1 copolymers, ethylene-α-olefin-unconjugated diene copolymers, chlorinated polyethylene, polyvinyl chloride, polyvinylidene chloride, acrylonitrile-butadiene-styrene copolymers, polyvinyl alcohol, acrylic resins, acrylonitrile-styrene copolymers, thermoplastic polyamide resins such as polyamide 6, polyamide 11, polyamide 12, polyamide 46, polyamide 66, polyamide 610, polyamide 6T/66 copolymers, polyamide 6T/6I copolymers, polyamide 9T, and polyamide 10T, thermoplastic polyester resins such as polyethylene terephthalate, polybutylene terephthalate, and polyarylate, thermoplastic vinyl aromatic resins such as polystyrene, thermoplastic polyurethane, thermoplastic resins such as polycarbonate resins, polyphenylene ether, polyphenylene sulfide, polyimide, polysulfone, and polyethersulfone, and thermosetting resins such as unsaturated polyester resins, epoxy resins, phenol resins, urea resins, melamine resins, diallyl phthalate resins, and silicone resins.

Examples of the various additives include weathering stabilizers, heat stabilizers, antioxidants, ultraviolet absorbers, antistatic agents, anti-slip agents, antiblocking agents, anti-fogging agents, nucleating agents, lubricants, pigments, dyes, antiaging agents, hydrochloric acid absorbers, inorganic or organic fillers, organic or inorganic foaming agents, cross-linking agents, cross-linking aids, pressure-sensitive adhesives, softening agents, and flame retardants.

In the resin composition of the present invention, the content of the resin composed of the particle (X) is usually 30% by mass or more, preferably 40% by mass or more, more preferably 50% by mass or more.

The resin composition of the present invention contains the resin composed of the particle (X) of aspect 1 and, as mentioned above, may further contain an additional component. In this case, the resin composition of the present invention is obtained, for example, by mixing the resin with the additional component. Examples of the mixing method include, but are not particularly limited to, a compounding method using a twin-screw extruder, and a mixing method by dry blending.

[Molded Article]

The molded article of the present invention is obtained by molding the 4-methyl-1-pentene polymer particle (X) of aspect 1, the resin composed of the particle (X), or the resin composition containing the resin. Also, the molded article of the present invention is obtained by molding the 4-methyl-1-pentene resin (X) obtained by the production method of aspect 2, or the resin composition containing the resin (X).

(1) Molding Method

Various molding methods known in the art can be applied to the molding method. Examples thereof include various molding methods such as injection molding, extrusion molding, injection stretch blow molding, blow molding, cast molding, calender molding, press molding, stamping molding, inflation molding, and roll molding. The 4-methyl-1-pentene polymer particle (X) of aspect 1, the resin composed of the particle (X), the resin composition containing the resin, the 4-methyl-1-pentene resin (X) obtained by the production method of aspect 2, and the resin composition containing the resin (X) can be processed into the molded article of interest, for example, a single-layer or laminated film, a sheet, a membrane, a tape, a hollow molded article, an injection molded article, fiber, a foam, or the like by these molding methods.

(2) Shape

The shape of the molded article is not particularly limited. Examples thereof include tube, film, sheet, membrane, tape, plate, rod, fiber, and nonwoven fabric shapes.

In the description below, the film is a generic name for planar molded articles and also conceptually includes sheets, tapes, and the like.

(3) Application The molded article of the present invention is excellent in high heat resistance, high tenacity, lightness in weight, water resistance, low permittivity, low whitening on bending, etc. and as such, can be used in a wide range of fields such as food containers, medical containers, household goods, electric or electronic materials, and automobile components, without limitations on applications.

In the food, medical, and houseware fields, examples thereof include food packaging materials such as industrial wrap films, household wrap films, processed fish packaging materials, vegetable packaging materials, fruit packaging materials, fermented food packaging materials, confectionery packaging materials, oxygen absorber packaging materials, packaging materials for retort food, freshness keeping films, flower bulb packaging materials, seed packaging materials, and films for vegetable or mushroom cultivation; food containers such as retort food containers, heat-resistant vacuum molded containers, prepared food containers, lid materials for prepared food, baking cartons, eating utensils, seasoning containers, kitchen goods, retort containers, freeze preservation containers, retort pouches, microwave oven heat-resistant containers, frozen food containers, chilled sweet cups, cups, nursing bottles, and beverage bottles;

medical instruments such as blood transfusion sets, medical bottles, medical containers, medical tubes, transfusion tubes, connectors or packings, medical hollow bottles, medical bags, transfusion bags, blood preservation bags, transfusion bottles, chemical containers, detergent containers, containers for fabric softeners, containers for bleaches, vials, plastic syringes, prefilled syringes, medicine packaging materials, cell culture bags, cell culture containers, cell inspection films, medical gaskets, medical caps, drug caps, gaskets, and packing materials for use in high-temperature treatments such as boiling treatment and high-pressure steam sterilization; physicochemical experimental equipment such as beakers, Petri dishes, flasks, animal cages, and preservation containers; various medical inspection kits such as PCR plates, PCR tubes, foil seals for PCR plates, buffer containers, and marker containers; lenses such as contact lenses and glass lenses; glasses such as protecting glasses or goggles for works or experiments, and sunglasses; head-up displays, head-mounted displays and their in-vehicle applications; ornamental containers such as merchandise displays, household ornamental water tanks, and large commercial water tanks; and others such as treads, automobile components, pens and pencils, sport goods, laminate resins, asphalt blend resins, materials for electron beam cross-linking, containers for shampoos, containers for rinses, cosmetics containers, perfume containers, toner containers, powder containers, containers for adhesives, containers for gasoline tanks, containers for kerosene, and heat-resistant containers.

In the electronic material field, examples thereof include transparent flexible films for electronic apparatuses such as electronic displays such as electronic papers, organic EL display apparatuses, LED (light emitting diode) lighting apparatuses, and CMOS (complementary metal oxide semiconductor) sensors in which transparent and flexible performance can be exploited; films for various electronic devices or optical waveguides, such as interlayer insulating films for semiconductors, buffer coats, boards for flexible printed wiring circuits, and liquid crystal oriented films; flexible boards for liquid crystal display apparatuses, organic EL display apparatuses, organic TFT, etc.; films for electronic materials in which mold release properties, heat resistance, and low-dielectric properties can be exploited, for example, mold releasing films such as mold releasing films for flexible printed circuit boards, mold releasing films for ACM substrates, mold releasing films for rigid substrates, mold releasing films for rigid flexible printed circuit boards, mold releasing films for advanced composite materials, mold releasing films for carbon fiber composite material curing, mold releasing films for glass fiber composite material curing, mold releasing films for aramid fiber composite material curing, mold releasing films for nanocomposite material curing, mold releasing films for filler curing, mold releasing films for semiconductor encapsulation, mold releasing films for polarizing plates, mold releasing films for diffusion sheets, mold releasing films for prism sheets, mold releasing films for reflection sheets, cushion films for mold releasing films, mold releasing films for fuel cells, mold releasing films for various rubber sheets, mold releasing films for urethane curing, and mold releasing films for epoxy curing; solar cell encapsulating sheets, solar cell back sheets, plastic films for solar cells, battery separators, separators for lithium ion cells, electrolyte membranes for fuel cells, and pressure-sensitive adhesive or adhesive separators, light guide plates, and optical disks; base materials, pressure-sensitive adhesive materials, and separators for semiconductor process films such as dicing tapes, back grind tapes, die bonding films, two-layer FCCL, and films for film condensers; pressure-sensitive adhesive films, stress relaxation films, films for pellicles, and films for polarizing plates; protecting films such as protecting films for polarizing plates, protecting films for liquid crystal panels, protecting films for optical components, protecting films for lenses, protecting films for electric components or electric appliances, protecting films for mobile phones, protecting films for personal computers, protecting films for touch panels, window glass protecting films, films for bake coating, masking films, films for condensers, capacitor films, tab lead films, capacitor films for fuel cells, reflection films, diffusion films, laminates (including glass), radiation-resistant films, γ ray-resistant films, and porous films; heat dissipation films or sheets, molds for electronic component encapsulant production, LED molds, laminate plates for high-frequency circuits, covering materials for high-frequency cables, optical waveguide substrates, glass fiber composites, carbon fiber composites, glass interlayers, films for safety glass, window films for building materials, arcade domes, gymnasium window glass substitutes, films for LCD substrates, bulletproof materials, films for bulletproof glass, heat shield sheets, and heat shield films; release paper such as release paper for synthetic leather, release paper for advanced composite materials, release paper for carbon fiber composite material curing, release paper for glass fiber composite material curing, release paper for aramid fiber composite material curing, release paper for nanocomposite material curing, and release paper for filler curing; and heat-resistant and water-resistant printing paper, films for packaging, mold releasing films, breathable films, reflection films, synthetic paper, films for displays, conductive films for displays, and display barrier films.

Examples of other applications include: mandrels for rubber hose production, sheaths, sheaths for rubber hose production, hoses, tubes, release paper for synthetic leather, industrial tubes, cooling water piping, hot water piping, wire covering materials, millimeter-wave signal cable covering materials, high-frequency signal cable covering materials, eco-wire covering materials, in-vehicle cable covering materials, signal cable covering materials, insulators for high-voltage wires, wiring ducts, tubes for cosmetics or perfume sprays, pipes and wire harnesses; interior and exterior materials of automobiles, motorcycles, railroad vehicles, air planes, ships, etc.; abrasion-resistant automobile interior and exterior materials; automobile interior and exterior materials such as instrument panel skins, door trim skins, rear package trim skins, ceiling skins, rear pillar skins, seat back garnishes, console boxes, arm rests, air back case lid materials, shift knobs, assist grips, side step mats, meter covers, battery caps, fuses, automatic washing sensor components, ignitions, coil bobbins, bushings, bumpers, car heater fans, radiator grills, wheel covers, electric source connectors for EV, in-vehicle display polarizing plates, louvers, armrests, rail insulators, motorcycle windshields, reclining covers, sheets in trunks, seat belt buckles, moldings such as inner or outer moldings, bumper moldings, side moldings, roof moldings, and belt moldings, air spoilers, automobile seals such as door seals and body seals, glass run channels, mudguards, kicking plates, step mats, number plate housings, automobile hose members, air duct hoses, air duct covers, air intake pipes, air dam skirts, timing belt cover seals, hood cushions, door cushions, cup holders, side brake grips, shift knob covers, seat adjustment knobs, wire harness grommets, suspension cover boots, glass guides, inner belt line seals, roof guides, trunk lid seals, molded quarter window gaskets, corner moldings, glass encapsulation, hood seals, glass run channels, secondary seals, bumper components, body panels, side shields, door skins, weather strip materials, hoses, steering wheels, wire harness covers, and seat adjuster covers; special tires such as vibration damping tires, silent tires, car race tires, and radio control tires; packings, automobile dust covers, lamp seals, automobile boots, rack and pinion boots, timing belts, wire harnesses, grommets, emblems, air filter packings, automobile connectors, ignition coils, switches, lamp reflectors, relays, electric control unit cases, sensor housings, head lamps, meter plates, insulators, bearing retainers, thrust washers, lamp reflectors, door handles, grazing, panoramic roofs, solenoid valves, ECU cases, connectors for unit connection, alternators, terminal blocks for HEV, electromagnetic valves, and coil assembly components; skin materials for furniture, shoes, cloths, bags, building materials, and the like; seal materials for architecture, waterproof sheets, building material sheets, piping joints, dressing tables, bathroom ceilings, impellers, building material gaskets, window films for building materials, iron-core protecting members, sheets for foundation improvement, water stops, joint sealing materials, gaskets, doors, door frames, window frames, cornices, baseboards, opening frames, floor materials, ceiling materials, wall paper, health supplies (e.g., nonslip mats or sheets and tip-resistant films, mats, or sheets), health appliance components, impact absorbing pads, protectors or protecting equipment (e.g., helmets and guards), sport goods (e.g., sport grips and protectors), sport protecting equipment, rackets, mouth guards, balls, golf balls, and carrying implements (e.g., impact absorbing grips for carrying and impact absorbing sheets); impact absorbers such as vibration damping pallets, impact absorbing dampers, insulators, impact absorbers for shoes, impact absorbing foams, and impact absorbing films or sheets; grip materials (pens and pencils, industrial tools, sporting equipment, vehicle handles, commodities, electric instruments, furniture, etc.), camera bodies and components, office automation equipment components, copier structural parts, printer structural parts, members for air planes, in-flight meal trays, facsimile structural parts, pump components, electrical tool components, drying/washing machine components, heater pump nozzles or ports, IH rice cookers, rice cooker inner lid materials, microwave oven roller stay rings, vacuum cleaner fan guides, pump or filter cases for electric rice jars, garbage disposal components or tanks or heating and drying components, meters for milk, filter bowls, escalator components, ultrasonic motor housings, absolute encoders, small pump housings, television members, hair dryer housings, lighting covers, sundries, coffee drippers, humidifier components, iron components, tap water instrument components, drinking flasks, combs, fountain pens, pencil cases, pencil sharpeners, sport leisure goods, ski goggles, karate or kendo protective gears, fins for surfing, musical instruments, fish breeding tanks, sandals, snow shovels, fishing rod cases, toys, treads, shoe soles, shoe midsoles or inner soles, soles, sandals, chair skins, bags, school bags, wears such as jumpers and coats, bands, rods, ribbons, notebook covers, book covers, keyholders, pencases, wallets, chopsticks, China spoons, microwave cooking pans, business card holders, commuter pass holders, suckers, tooth blushes, floor materials, gymnastic mats, electrical tool components, agricultural equipment components, heat dissipation materials, transparent substrates, soundproof materials, acoustic absorbents, cushion materials, wire cables, shape memory materials, connectors, switches, plugs, and home electronic components (motor components, housings, etc.); industrial seal materials, industrial sewing machine tables, number plate housings, cap liners such as PET bottle cap liners, protecting film adhesive layers, pressure-sensitive adhesive materials such as hot melt adhesive materials, stationery, and office supplies; precision measuring equipment or office automation equipment supporting members such as office automation printer legs, facsimile legs, sewing machine legs, motor supporting mats, and audio vibration-proof materials; heat-resistant packings for office automation, optical media such as CD, DVD and Blu-ray, cells for optical measurement, cloth cases, clear cases, clear files, clear sheets, and desk mats; applications as fiber, for example, monofilaments, multifilaments, cut fiber, hollow fiber, nonwoven fabrics, stretchable nonwoven fabrics, fiber, waterproof fabrics, breathable woven fabrics and fabrics, disposable diapers, sanitary products, hygiene products, filters, bug filters, filters for dust collection, air cleaners, hollow fiber filters, water-purifying filters, filter fabrics, filter paper, gas separation membranes, artificial liver (cases and hollow fiber), filter reverse osmotic membranes, heart-lung machines, injection syringes, three-way cocks, transfusion sets, instruments for surgeons, flowmeters, dental instruments, instruments for contact lens sterilization, inhaling masks, cells for analysis, milking machines, fire alarm boxes, fire extinguishers, helmets, and burn-in sockets.

Further, the molded article of the present invention is also suitably used in coating materials, films and sheets obtained by coating, mold release materials, water-repellant materials, insulating films, adhesive materials, pressure-sensitive adhesive materials, coated paper, transparent sealants, sealants, hot melt-type pressure-sensitive adhesives or adhesives, solvent-type pressure-sensitive adhesives or adhesives, film-like pressure-sensitive adhesives or adhesives, fabric tapes, craft tapes, elastic adhesives, etc.

The 4-methyl-1-pentene polymer particle (X), the resin and the resin composition, and the 4-methyl-1-pentene resin (X) and the resin composition containing the same may be processed into fine powders by crushing. The obtained fine powders can be used, for example, as an additive for ink compositions or coating compositions, as an additive for metallurgical powder compositions, as an additive for powder compositions for ceramic sintering, as an additive for pressure-sensitive adhesives, as an additive for rubbers, as a mold release agent for toner, or as a die mold release agent. Further, the obtained fine powders can also be used as a resin additive for shafts, gear wheels, cams, electric components, camera components, automobile components, components intended for household goods, or as a resin additive for waxes, greases, engine oils, fine ceramics, plating, etc.

EXAMPLES

Hereinafter, the present invention will be described in more detail with reference to Examples. However, the present invention is not limited by these Examples.

[Methods for Measuring Various Physical Properties]

<Particle Sizes (D50) of Catalyst Support and Catalyst>

D50 of volume statistics was determined by the laser diffraction/scattering method using MT3300EX II manufactured by MicrotracBEL Corp.

<Elemental Analysis (Al Content in Support)>

The measurement was performed using an ICP (inductively coupled plasma) spectrometry apparatus: ICPS-8100 model manufactured by Shimadzu Corp. For the quantitative or qualitative analysis of aluminum and zirconium, a sample was wet-digested with sulfuric acid and nitric acid and made into a constant volume (including filtration and dilution, if necessary), to give an assay solution.

<Amount of Solvent-Soluble Portion (SP) of Polymer>

The polymer slurry obtained in the step (2) was filtered and thereby separated into a solid substance (white solid) and a filtrate. Subsequently, the solvent was removed from the filtrate by the evaporation method, to give a polymer dissolved in the filtrate. Then, the amount of the polymer in the filtrate was calculated according to the following expression.

Amount (% by Mass) of the Polymer in the Filtrate=$W2/(W1+W2)\times100$

W1: the mass (g) of the solid substance (white solid) separated by filtration

W2: the mass (g) of the polymer dissolved in the filtrate of the slurry

<Bulk Density (BD)>

The polymer slurry obtained in the step (2) was filtered and thereby separated into a solid substance (white solid) and a filtrate. The bulk density of the obtained solid in the form of particles was determined from the mass of the sample in a container (internal capacity: 100 mL) in accordance with JIS K-6721.

<Slurry (Polymerization Solution) Properties>

The obtained polymerization solution was indicated by "good" when the slurry had favorable solid-liquid separability in the filtration step, "poor" when the slurry had poor solid-liquid separability due to its gruel-like state in the filtration step, and "solution" when a solution was present without becoming slurry.

[Methods for Measuring Polymer Physical Properties, Etc.]

<Proportions by Mass of Polymers Produced in Step (1) and Step (2)>

At the completion of polymerization in the step (1), the polymer slurry was sampled, and the slurry concentration was measured to calculate the amount of the polymer produced in the step (1). From this amount and the amount of the finally obtained polymer, the proportion by mass of the polymer produced in each step was determined. Filtration was performed using a Kiriyama filter paper (opening: 1 μm) as a filtration method at room temperature (25° C.) as a filtration temperature, under washing with hexane to calculate the slurry concentration. In the examples given below, filtration was performed under these conditions. The solvent-soluble portion is excluded from the calculation of the proportion of the polymer and the measurement of physical properties described below (except for Reference Example 2A).

<Comonomer Content in 4-Methyl-1-Pentene Copolymer>

The content of the constitutional unit derived from the comonomer (comonomer content) was calculated from $^{13}$C-NMR spectra using the following apparatus and conditions.

The measurement was performed using AVANCE III cryo-500 nuclear magnetic resonance apparatus manufactured by Bruker BioSpin under the following conditions: solvent: an o-dichlorobenzene/benzene-$d_6$ (4/1 v/v) mixed solvent; sample concentration: 55 mg/0.6 mL; measurement temperature: 120° C.; observed nucleus: $^{13}$C (125 MHz); sequence: single-pulse proton broadband decoupling; pulse width: 5.0 μsec (45° pulse); repetition time: 5.5 sec; number of scans: 64; and chemical shift reference value: 128 ppm of benzene-$d_6$. The comonomer content was calculated using an integrated value of the main chain methine signals according to the following expression.

Comonomer content (%)=$[P/(P+M)]\times100$ wherein P represents the total peak area of comonomer main chain methine signals, and M represents the total peak area of 4-methyl-1-pentene main chain methine signals.

The comonomer content in the polymer produced in the step (1) was determined using a polymer obtained from polymer slurry sampled at the completion of polymerization in the step (1), and the comonomer content in the polymer produced in the step (2) was determined using the comonomer content in the polymer obtained in the step (1), the comonomer content in the final polymer (step (1)+step (2)), and the proportion of the polymer produced in each step.

Specifically, the comonomer contents in the polymers produced in the steps (1) and (2) and the final polymer are defined as $m_1$, $m_2$ and $m_f$, respectively, and the proportions of the polymers produced in the steps (1) and (2) are defined as $w_1$ and $w_2$, respectively. $m_2=(m_f-w_1 \cdot m_1)/w_2$ holds.

<Meso Diad Fraction>

The meso diad isotacticity (also referred to as meso diad fraction) (m) of the 4-methyl-1-pentene polymer was defined as the fraction of isobutyl branches having the same orientation when the head-to-tail linkage of arbitrary two 4-methyl-1-pentene units in the polymer chain is expressed by planar zigzag arrangement, and determined from $^{13}$C-NMR spectra according to the following expression.

Meso diad isotacticity (m) (%)=$[m/(m+r)]\times100$ wherein m and r each represent absorption intensity derived from the main chain methylenes of head-to-tail linked 4-methyl-1-pentene units represented by the formula given below.

[Chem. 4]

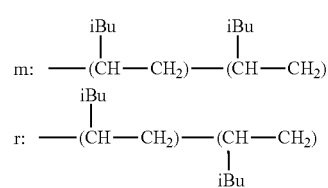

The $^{13}$C-NMR spectra were measured using AVANCE III cryo-500 nuclear magnetic resonance apparatus manufactured by Bruker BioSpin under the following conditions: solvent: an o-dichlorobenzene/benzene-$d_6$ (4/1 v/v) mixed solvent; sample concentration: 60 mg/0.6 mL; measurement temperature: 120° C.; observed nucleus: $^{13}$C (125 MHz); sequence: single-pulse proton broadband decoupling; pulse width: 5.0 μsec (45° pulse); repetition time: 5.5 sec; and chemical shift reference value: 128 ppm of benzene-$d_6$.

Peak regions were classified into a first region on a high-magnetic field side and a second region on a low-magnetic field side by delimiting a region of 41.5 to 43.3 ppm at the local minimum point of a peak profile.

In the first region, the main chain methylenes in the linkage of the two 4-methyl-1-pentene units represented by (m) resonated, and the integrated value of these units regarded as a 4-methyl-1-pentene homopolymer was referred to as "m". In the second region, the main chain methylenes in the linkage of the two 4-methyl-1-pentene units represented by (r) resonated, and the integrated value thereof was referred to as "r". A value less than 0.01% was considered equal to or lower than the detection limit.

<Intrinsic Viscosity [η]>

Specific viscosity imp was determined at 135° C. in decalin using an automatic viscosity measurement apparatus VMR-053PC manufactured by RIGO Co., Ltd. and a modified Ubbelohde-type capillary viscometer, and the intrinsic viscosity ([η]) was calculated according to the following expression.

$$[\eta]=\eta sp/\{c(1+K\cdot\eta sp)\}$$

(c: solution concentration [g/dl], K: constant)

The intrinsic viscosity [η] of the polymer produced in the step (1) was determined using a polymer obtained from polymer slurry sampled at the completion of polymerization in the step (1), and the intrinsic viscosity [η] of the polymer produced in the step (2) was determined using the intrinsic viscosity [η] of the polymer obtained in the step (1), the intrinsic viscosity [η] of the final polymer (step (1)+step (2)), and the proportion of the polymer produced in each step. Specifically, the intrinsic viscosities [η] in the polymers produced in the steps (1) and (2) and the final polymer are defined as $[\eta]_1$, $[\eta]_2$ and $[\eta]_f$, respectively, and the proportions of the polymers produced in the steps (1) and (2) are defined as $w_1$ and $w_2$, respectively. $[\eta]_2=([\eta]_f-w_1\cdot[\eta]_1)/w_2$ holds.

<Melting Point (Tm) and Heat of Fusion (ΔH)>

The temperature of approximately 4 mg of a sample was increased from 30° C. to 280° C. in a nitrogen atmosphere (30 ml/min) using EXSTAR DSC6220 manufactured by SII Nanotechnology Inc. The temperature was kept at 280° C. for 5 minutes and then decreased to −50° C. at 10° C./min. The temperature was kept at −50° C. for 5 minutes and then increased to 280° C. at 10° C./min. A temperature at which the summit of a crystal melting peak appeared, observed in the second temperature increase was referred to as the melting point (Tm). The heat of fusion in association with fusion was referred to as ΔH. When a plurality of peaks were detected as to the polymer produced in each step, the highest temperature was referred to as the melting point (Tm). The melting point (Tm) of the polymer produced in the step (2) was determined by analyzing the polymer produced in the step (1) and the final polymer.

<Cfc Measurement>

The CFC measurement was performed under the following conditions.
Apparatus: CFC2 cross fractionation chromatograph (Polymer Characterization, S.A)
Detector (built-in): IR4 infrared spectrophotometer (Polymer Characterization, S.A)
Detection wavelength: 3.42 μm (2,920 cm$^{-1}$); fixed
Sample concentration: sample: 30 mg/30 mL (diluted with o-dichlorobenzene (ODCB))
Injection Volume: 0.5 mL
Temperature conditions: the temperature was increased to 145° C. at 40° C./min and kept for 30 minutes. The temperature was decreased to 0° C. at 1° C./min and kept for 60 minutes, followed by the evaluation of the amount of an eluate for each elution segment. Temperature change among the segments was set to 40° C./min.
Elution segment: the amount of an eluate was evaluated at 0, 5, 10, 15, 20, 25, 30, 35, 50, 70, 90, 95, 100, 102, 104, and 106° C., then every 1° C. from 108° C. to 135° C., and further at 140 and 145° C.
GPC column: Shodex HT-806M×3 (Showa Denko K.K.)
GPC column temperature: 145° C.
GPC column calibration: monodisperse polystyrene (Tosoh Corp.)
Molecular weight calibration method: preparation calibration method (based on polystyrene)
Mobile phase: o-dichlorobenzene (ODCB) supplemented with BHT
Flow rate: 1.0 mL/min Synthesis Example 1

[Synthesis of Transition Metal Complex (Metallocene Compound (A))]

(8-Octamethylfluoren-12'-yl-(2-(adamantan-1-yl)-8-methyl-3,3b,4,5,6,7,7a,8-octahydrocyclopenta[a]indene)) zirconium dichloride (metallocene compound (al)) was synthesized according to Synthesis Example 4 of WO 2014/050817.

[Preparation of Solid Catalyst Component (Metallocene Catalyst)]

The support (B) used was solid polymethylaluminoxane in the form of particles having D50 of 8 μm and an aluminum atom content of 42% by mass (manufactured by Tosoh Finechem Corp). A 100 mL three-neck flask equipped with a stirrer and thoroughly purged with nitrogen was charged with 29.9 mL of purified decane and 7.26 mL (14.3 mmol based on an aluminum atom) of a solution of the solid polymethylaluminoxane in hexane/decane at 30° C. under a stream of nitrogen, to give a suspension. To the suspension, 12.8 mL of a 4.59 mmol/L solution of 50 mg (0.0586 mmol based on a zirconium atom) of the metallocene compound (al), which had been synthesized beforehand, in toluene was added with stirring. The stirring was terminated 1.5 hours later, and washing with decane was performed by decantation (washing efficiency: 98%), to give 50 mL of a slurry solution (supporting rate of Zr: 96%). The obtained solid catalyst component (metallocene catalyst) was in the form of particles, and its D50 was 8 μm.

[Preparation of Prepolymerization Catalyst Component]

The slurry solution thus prepared was charged with 4.0 mL of a decane solution of diisobutyl aluminum hydride (1 mol/mL based on an aluminum atom) and further with 15 mL (10.0 g) of 3-methyl-1-pentene under a stream of nitrogen. The stirring was terminated 1.5 hours later, and washing with decane was performed by decantation (washing efficiency: 95%), to give 100 mL of decane slurry (Zr recovery rate: 93%, amount based on a zirconium atom: 0.548 mmol/ L).

Synthesis Example 2

A solid catalyst component (metallocene catalyst) was obtained in the same way as in Synthesis Example 1 except that solid polyaluminoxane in the form of particles having D50 of 32 μm and an aluminum atom content of 44% by mass (synthesized using the method described in WO 2014/ 123212) was used as the support (B) in [Preparation of solid catalyst component (metallocene catalyst)] of Synthesis Example 1. The obtained solid catalyst component (metallocene catalyst) was in the form of particles having D50 of 32 μm. Also, a prepolymerization catalyst component was prepared in the same way as in Synthesis Example 1, to give 100 mL of decane slurry (Zr recovery rate: 82%, amount based on a zirconium atom: 0.482 mmol/L).

[Example 1A] Particle (X1-1)

A SUS polymerization vessel (internal capacity: 1 L) equipped with a stirrer was charged with 425 mL of purified decane and 0.4 mL (0.4 mmol based on an aluminum atom) of a triethyl aluminum solution (1.0 mmol/mL based on an aluminum atom) at room temperature (25° C.) under a stream of nitrogen. Subsequently, 0.0014 mmol (based on a zirconium atom) of the decane slurry of the prepolymerization catalyst component that had been prepared in Synthesis Example 1 was added thereto, and the temperature was increased to 40° C. After reaching 40° C., 30 NmL of hydrogen was charged thereinto. Subsequently, the polymerization vessel was continuously charged with 106 mL of 4-methyl-1-pentene (4MP-1) at a constant rate over 30 minutes. The start of this charging was referred to as the start of polymerization, and 45° C. was kept for 3 hours (step (1)). After a lapse of 3 hours, the system was depressurized at 45° C. and pressurization and depressurization were performed 3 times using nitrogen (0.6 MPa) in order to discharge residual hydrogen out of the system. Then, 30 NmL of hydrogen was charged thereinto at 45° C. under a stream of nitrogen. Subsequently, the polymerization vessel was continuously charged with a mixed solution of 79.4 mL of 4-methyl-1-pentene and 7.4 mL of 1-decene at a constant rate over 30 minutes. The start of this charging was referred to as the start of polymerization, and 45° C. was kept for 3 hours (step (2)). After a lapse of 3 hours from the start of polymerization, the temperature was decreased to room temperature, followed by depressurization. Immediately thereafter, the polymerization solution (slurry) containing a white solid was filtered, to give a solid substance. This solid substance was dried under reduced pressure at 80° C. for 8 hours, to give 105.4 g of a particle (X1-1). Various results are shown in Tables 1A and 2A.

Examples 2a to 8A

Each polymer particle was obtained by the same operation as in Example 1A except that the polymerization conditions were changed as described in Table 1A. Various results are shown in Tables 1A and 2A.

Comparative Example 1A

Polymerization was performed only by the operation of the step (1) using the amount of the catalyst, the amount of 4MP-1 fed, the amount of hydrogen, the amount of 1-decene fed, and the polymerization time described in Table 1A. Various results are shown in Tables 1A and 2A.

Comparative Examples 2A to 6A

Each 4-methyl-1-pentene polymer particle was obtained by changing the proportions of 4-methyl-1-pentene, an additional α-olefin (1-decene or a mixture of 1-hexadecene and 1-octadecene), and hydrogen in accordance with the polymerization method described in Comparative Example 9 of WO 2006/054613. Specifically, all of these 4-methyl-1-pentene polymer particles were obtained by single-stage polymerization using, as a catalyst for polymerization, a solid titanium catalyst obtained by reacting anhydrous magnesium chloride, 2-ethylhexyl alcohol, 2-isobutyl-2-isopropyl-1,3-dimethoxypropane and titanium tetrachloride. Various results are shown in Tables 1A and 2A.

Comparative Example 7A

A polymer particle was obtained by polymerization operation under the conditions described in Table 1A using the solid titanium catalyst component (0.042 mmol based on a Ti atom) described in [Preparation Example 1] and [Preparation Example 2] of WO 2009/008409 instead of the catalyst component. Various results are shown in Tables 1A and 2A.

In Table 2A, "Step (1)" represents the polymer produced in the step (1); "Step (2)" represents the polymer produced in the step (2); and "Total" represents the final polymer (which corresponds to the particle (X) in Examples).

Reference Example 1A

Polymerization was performed only by the operation of the step (1) using the amount of the catalyst, the amount of 4MP-1 fed, the amount of hydrogen, and the polymerization time described in Table 1A, to give a polymer particle. Various results are shown in Tables 1A and 2A.

Reference Example 2A

Polymerization was performed only by the operation of the step (2) using the amount of the catalyst, the amount of 4MP-1 fed, the amount of hydrogen, the amount of 1-decene fed, and the polymerization time described in Table 1A. The polymer was dissolved in the solvent and therefore dried at 120° C. for 8 hours using a vacuum dryer, to give a polymer. Various results are shown in Tables 1A and 2A.

Comparative Example 8A

The polymer particle obtained in Reference Example 1A and the polymer obtained in Reference Example 2A were mixed at a mass ratio of 42:58 and granulated by the method given below, and the obtained resin composition was evaluated. Various results are shown in Tables 1A and 2A.

[Methods for Measuring Resin Physical Properties]

The resin physical properties were evaluated by the methods given below. The results are shown in Table 3A.

<Molding Method>

100 parts by mass of each of the polymer particles of Examples 1A to 8A, the polymer particles of Comparative Examples 1A to 7A, and the polymer for evaluation of Comparative Example 8A (the mixture of the polymer particle obtained in Reference Example 1A and the polymer obtained in Reference Example 2A at a mass ratio of 42:58) were mixed with 0.1 parts by mass of tri(2,4-di-t-butylphenyl) phosphate as a secondary antioxidant and 0.1 parts by mass of n-octadecyl-3-(4'-hydroxy-3',5'-di-t-butylphenyl) propionate as a heat stabilizer. After a lapse of appropriate time, the resulting mixture was granulated under conditions of a set temperature of 260° C., an amount of the resin extruded of 60 g/min and the number of revolutions of 200 rpm using a twin-screw extruder BT-30 manufactured by PLABOR Research Laboratory of Plastics Technology Co., Ltd. (screw diameter: 30 mmφ, L/D: 46), to give a resin composition.

A 1 mm-thick iron plate hollowed out by 8 cm square was placed between two iron plates, and 5.2 g of the resin composition was added to the hollow site. The temperature of a compression molding machine manufactured by Shinto Metal Industries, Ltd. (mold clamping: 50 ton) was increased to 270° C., and the iron plates were inserted thereto. The resin composition was fused by still standing for 7 minutes. Then, the iron plates were compressed at a pressure of 10 MPa, kept for 3 minutes, and then taken out thereof. The iron plates were inserted to the compression machine set to 23° C., and cooled over 3 minutes at a pressure of 10 MPa. The 1 mm-thick molded article was taken out of the hollow site and used as a pressed plate for evaluation.

<Tensile Modulus of Elasticity>

The modulus of elasticity, which is tensile characteristics, was evaluated by a tensile test conducted at an inter-chuck distance of 65 mm and a pulling rate of 50 mm/min using a test piece obtained by stamping from the 1 mm-thick pressed plate mentioned above and using a universal tensile testing machine 3380 manufactured by Instron in accordance with ASTM D 638.

<Indexes for High Heat Resistance and Low Rigidity (Flexibility)>

As indexes for high heat resistance and low rigidity (flexibility), the case where at least one melting point peak appeared at 220° C. or higher and the tensile modulus of elasticity (MPa) was smaller than Tm (° C.)×49.6−10400 was graded BB, and the case where further the tensile modulus of elasticity (MPa) was smaller than Tm (° C.)× 49.6−10800 was graded AA.

<Observation of Phase-Separated Structure>

The pressed plates of Examples 1A to 3A and Comparative Example 8A were each sliced in a direction where the cross section was laterally viewed (sideview), and the phase-separated structure was observed under a transmission electron microscope JEM-2100Plus manufactured by JEOL Ltd. The images of observation at a 10000× magnification are shown in FIGS. 2 to 5.

<Haze>

The haze value (total haze) of the pressed plate was evaluated in air in accordance with JIS-K-7136 using a haze meter NDH4000 manufactured by Nippon Denshoku Industries Co., Ltd.

<Appearance and Defect>

The resin composition granulated by the method described in <Molding method> was melt-cast-molded under conditions involving a cylinder temperature of 270° C., a die temperature of 270° C., a roll temperature of 80° C., and a take-over speed of 5 m/min using a single-screw sheet molding machine manufactured by Tanaka Iron Works Co., Ltd., to give a film having a thickness of 50 μm. When a 1000 m film was continuously produced, the frequency with which gum accumulated on a lip was dropped onto the film to cause deterioration in film appearance or defects was investigated. For the 1000 m film, the case of 5 or less defects of stain ascribable to the gum was graded BB, and the case of 6 or more such defects was graded CC. The lip of the molding machine was cleaned each time one level was completed, and comparison was performed.

As for the level of BB, a sample totally free from poor appearance ascribable to cracks or breaking at an end portion upon release from cooling roll surface during the 1000 m film production was determined to have a particularly favorable state and graded AA.

Comparison Between Examples and Comparative Examples

Examples 1A to 8A were found to have high stereoregularity from a high meso diad fraction, excellent heat resistance from a high melting point (Tm), and excellent balance between heat resistance and flexibility from the relationship between the melting point (Tm) and the tensile modulus of elasticity. Example 2A and Example 3A are excellent, especially, in the balance between heat resistance and flexibility.

Comparative Examples 1A to 6A did not satisfy the requirement (X-b) and were found to have insufficient balance between heat resistance and flexibility as compared with Examples.

Comparative Example 7A had insufficient stereoregularity and did not satisfy the requirement (X-c).

Comparative Example 8A does not fall into the polymer particle of the present invention because in this example, polymers corresponding to the polymer (x1) and the copolymer (x2) were each individually produced and then melt-blended. Although the stereoregularity, the heat resistance, and the balance between heat resistance and flexibility were excellent, the transparency was found to be poor. From its transmission electron microscope (TEM) image, the uniformity of the phase-separated structure was found to be low as compared with Examples 1A to 3A.

TABLE 1A

| | Step (1) | | | | | | Step (2) | | | | | | | | |
|---|---|---|---|---|---|---|---|---|---|---|---|---|---|---|---|
| | Amount of catalyst (μmol) | Amount of hydrogen (mL) | Amount of 4MP-1 fed (mL) | Amount of comonomer fed Species | Amount of comonomer fed (mL) | Polymerization time (h) | Amount of 4MP-1 fed (mL) | Amount of comonomer fed Species | Amount of comonomer fed (mL) | Amount of hydrogen (mL) | Polymerization time (h) | Yield (g) | Bulk density (BD) (g/cm³) | Slurry properties | Polymerization activity (kg/mmol-M) |
| Example 1A | 1.4 | 30 | 106.0 | — | 0 | 3.0 | 79.4 | 1-Decene | 7.4 | 30 | 3.0 | 105.4 | 0.375 | Favorable | 75.3 |
| Example 2A | 1.4 | 30 | 106.0 | — | 0 | 3.0 | 79.4 | 1-Decene | 21.8 | 30 | 3.0 | 119.7 | 0.381 | Favorable | 85.5 |
| Example 3A | 1.4 | 30 | 106.0 | — | 0 | 3.0 | 79.4 | 1-Decene | 27.5 | 30 | 3.0 | 131.5 | 0.380 | Favorable | 93.9 |
| Example 4A | 1.4 | 40 | 150.0 | — | 0 | 3.0 | 70.0 | 1-Decene | 10.5 | 20 | 3.0 | 131.7 | 0.413 | Favorable | 94.1 |
| Example 5A | 1.4 | 40 | 150.0 | — | 0 | 3.0 | 50.0 | 1-Hexene | 50.0 | 20 | 3.0 | 107.0 | 0.409 | Favorable | 76.4 |
| Example 6A | 1.4 | 35 | 130.0 | — | 0 | 3.0 | 128.0 | Ethylene | 1400.0 | 10 | 2.5 | 132.5 | 0.410 | Favorable | 94.7 |
| Example 7A | 1.4 | 30 | 106.0 | L168 | 2.8 | 3.0 | 86.1 | L168 | 26.0 | 25 | 3.0 | 139.3 | 0.402 | Favorable | 99.5 |
| Example 8A | 1.4 | 30 | 106.0 | L168 | 2.8 | 3.0 | 86.1 | L168 | 31.0 | 15 | 3.0 | 81.9 | 0.400 | Favorable | 58.5 |
| Comparative Example 1A | 0.4 | 120 | 196.0 | 1-Decene | 6.6 | 4.5 | — | — | — | — | — | 52.1 | — | Favorable | 130.3 |
| Comparative Example 2A | — | — | — | — | — | — | — | — | — | — | — | — | — | Favorable | — |
| Comparative Example 3A | — | — | — | — | — | — | — | — | — | — | — | — | — | — | — |
| Comparative Example 4A | — | — | — | — | — | — | — | — | — | — | — | — | — | Favorable | — |
| Comparative Example 5A | — | — | — | — | — | — | — | — | — | — | — | — | — | — | — |
| Comparative Example 6A | — | — | — | — | — | — | — | — | — | — | — | — | — | Favorable | — |
| Comparative Example 7A | 42 | 100 | 106.0 | — | 0 | 3.0 | 90.0 | 1-Decene | 7.4 | 100 | 3.0 | 116.2 | — | Favorable | 2.8 |
| Reference Example 1A (corresponding to step (1)) | 1.4 | 30 | 106.0 | — | 0 | 3.0 | — | — | — | — | — | 50.5 | 0.405 | Favorable | 36.1 |
| Reference Example 2A (corresponding to step (2)) | 1.4 | — | — | — | — | — | 110.0 | 1-Decene | 27.5 | 30 | 3.0 | 78.2 | 0.392 | Solution | 55.9 |
| Comparative Example 8A | — | — | — | — | — | — | — | — | — | — | — | — | — | — | — |

L168: 1-Hexadecene/1-octadecene mixture (mixing molar ratio: 60-40)

TABLE 2A

| | Physical properties of polymer | | | | | | | | | | | | | | | | | | | | |
|---|---|---|---|---|---|---|---|---|---|---|---|---|---|---|---|---|---|---|---|---|---|
| | Meso diad fraction | [η] | | | Comonomer content | | | | | | | Mass ratio between polymers produced in steps | DSC | | | | CFC peak | | | Amount of eluate in CFC 0° C. Cumulative mass percentage |
| | | | Step | Step | | | | Step | Step | Step | Step | | Total | | Step (1) | Step (2) | | | Lower than 100° C. | |
| | Total | Total | (1) | (2) | | Total | Total | (1) | (1) | (2) | (2) | | Tm | ΔH | Tm | Tm | 100° C. or higher | | | |
| | (%) | (dl/g) | (dl/g) | (dl/g) | Type | (wt %) | (mol %) | (wt %) | (mol %) | (wt %) | (mol %) | (1)/(2) | (° C.) | (J/g) | (° C.) | (° C.) | ° C. | ° C. | ° C. | (wt %) |
| Example 1A | 98.9 | 2.6 | 2.1 | 3.1 | 1-Decene | 3.3 | 2.0 | 0 | 0 | 6.3 | 3.9 | 48/52 | 239 | 38.0 | 239 | — | 131.0 | 121.9 | 97.0 | 0.20 |
| Example 2A | 98.5 | 2.7 | 1.9 | 3.2 | 1-Decene | 8.6 | 5.3 | 0 | 0 | 14.9 | 9.5 | 42/58 | 238 | 27.0 | 238 | 150 | 131.1 | 129.1 | 57.6 | 0.10 |
| Example 3A | 98.6 | 2.2 | 2.0 | 2.3 | 1-Decene | 9.2 | 5.7 | 0 | 0 | 14.9 | 9.5 | 38/62 | 239 | 26.0 | 239 | — | 131.0 | 121.0 | 40.0 | 0.39 |
| Example 4A | >98.5 | 2.1 | 1.8 | 2.8 | 1-Decene | 4.8 | 2.9 | 0 | 0 | 16 | 10.3 | 70/30 | 241 | 34.3 | 241 | 173 | 133.0 | 119.1 | 41.0 | 0.20 |
| Example 5A | >98.5 | 2.3 | 1.9 | 3.8 | 1-Decene | 12.8 | 12.8 | 0 | 0 | 58.5 | 58.5 | 78/22 | 241 | 37.0 | 241 | — | 133.1 | 120.1 | 38.0 | 0.32 |
| Example 6A | >98.5 | 2.8 | 2.3 | 3.5 | Ethylene | 1.6 | 4.7 | 0 | 0 | 3.5 | 9.8 | 55/45 | 239 | 30.0 | 239 | — | 133.2 | 118.3 | 40.0 | 0.44 |
| Example 7A | >98.5 | 2.4 | 2.2 | 2.4 | L168 | 12.1 | 4.6 | 3.1 | 1.1 | 18.0 | 7.2 | 39/61 | 224 | 15.0 | 224 | — | 122.0 | 113.5 | 40.0 | 0.50 |
| Example 8A | >98.5 | 2.8 | 2.1 | 4.3 | L168 | 8.7 | 3.3 | 2.8 | 1.0 | 20.8 | 8.5 | 67/33 | 226 | 25.0 | 226 | — | 125.0 | 114.5 | 42.0 | 0.31 |
| Comparative Example 1A | 99.0 | 2.1 | 2.1 | — | — | 4 | 2.4 | — | — | — | — | — | 220 | 37.0 | — | — | 105.0 | — | No peak | 0.10 |
| Comparative Example 2A | 97.5 | 2.1 | 2.1 | — | 1-Decene | 2.8 | 1.7 | — | — | — | — | — | 232 | 39.0 | — | — | 128.0 | 115.0 | No peak | ≥2.0 |
| Comparative Example 3A | 97.6 | 2.1 | 2.1 | — | 1-Decene | 1.2 | 0.7 | — | — | — | — | — | 239 | 41.0 | — | — | 130.0 | 119.0 | No peak | ≥2.0 |
| Comparative Example 4A | 97.6 | 2.1 | 2.1 | — | 1-Decene | 3.7 | 1.6 | — | — | — | — | — | 233 | 33.0 | — | — | 126.0 | 113.0 | No peak | ≥2.0 |
| Comparative Example 5A | 98.0 | 2.1 | 2.1 | — | L168 | 4.9 | 1.8 | — | — | — | — | — | 229 | 27.0 | — | — | 130.0 | 114.0 | No peak | ≥2.0 |
| Comparative Example 6A | 98.3 | 2.1 | 2.1 | — | L168 | 7 | 2.6 | — | — | — | — | — | 220 | 20.0 | — | — | 130.0 | 111.0 | No peak | ≥2.0 |
| Comparative Example 7A | 94.2 | 2.9 | 2.3 | 3.4 | 1-Decene | 5.2 | 3.2 | 0 | 0 | 10.3 | 6.4 | 50/50 | 238 | 32.8 | 238 | — | 133.7 | 127.9/114.6 | No peak | 2.80 |

TABLE 2A-continued

| | Meso diad fraction Total (%) | [η] Total (dl/g) | [η] Step (1) (dl/g) | [η] Step (2) (dl/g) | Comonomer content Type | Comonomer content Total (wt %) | Comonomer content Total (mol %) | Comonomer content Step (1) (wt %) | Comonomer content Step (1) (mol %) | Comonomer content Step (2) (wt %) | Comonomer content Step (2) (mol %) | Mass ratio between polymers produced in steps (1)/(2) | DSC Total Tm (°C) | DSC Total ΔH (J/g) | DSC Step (1) Tm (°C) | DSC Step (2) Tm (°C) | CFC peak 100° C. or higher (°C) | CFC peak Lower than 100° C. (°C) | Amount of eluate in CFC 0° C. Cumulative mass percentage (wt %) |
|---|---|---|---|---|---|---|---|---|---|---|---|---|---|---|---|---|---|---|---|
| Reference Example 1A (corresponding to step (1)) | 99.0 | 2.3 | 2.3 | — | 1-Decene | 0 | 0 | — | — | — | — | — | 239 | 44.0 | 240 | — | Not evaluated | Not evaluated | Not evaluated |
| Reference Example 2A (corresponding to step (2)) | 98.5 | 3.2 | — | 3.2 | 1-Decene | 14.9 | 9.5 | — | — | — | — | — | — | 0 | — | — | Not evaluated | Not evaluated | Not evaluated |
| Comparative Example 8A | 98.7 | 2.8 | — | — | 1-Decene | 7.4 | 4.6 | (0) | (0) | (14.9) | (9.5) | (Blended at 42/58) | 239 | 18.5 | 239 | — | Not evaluated | Not evaluated | 7.30 |

L168: 1-Hexadecene/1-octadecene mixture (mixing molar ratio: 60:40)

TABLE 3A

| | Resin physical properties | | | | | | |
|---|---|---|---|---|---|---|---|
| | Heat resistance (melting point) ≥220 (° C.) | Tensile modulus of elasticity MPa | Tm*49.6-10400 | Tm*49.6-10800 | High melting point and flexibility | Appearance and defect | Haze (1 mm-T) % |
| Example 1A | BB | 1319 | 1454 | 1054 | BB | AA | 2.3 |
| Example 2A | BB | 774 | 1405 | 1005 | AA | AA | 6.2 |
| Example 3A | BB | 784 | 1454 | 1054 | AA | AA | 19.5 |
| Example 4A | BB | 1280 | 1554 | 1154 | BB | AA | 19.5 or less |
| Example 5A | BB | 1310 | 1554 | 1154 | BB | BB | 19.5 or less |
| Example 6A | BB | 1200 | 1454 | 1054 | BB | BB | 19.5 or less |
| Example 7A | BB | 580 | 710 | 310 | BB | AA | 19.5 or less |
| Example 8A | BB | 750 | 810 | 410 | BB | AA | 19.5 or less |
| Comparative Example 1A | BB | 1100 | 512 | 112 | CC | AA | 19.5 or less |
| Comparative Example 2A | BB | 1330 | 1107 | 707 | CC | CC | 19.5 or less |
| Comparative Example 3A | BB | 1550 | 1454 | 1054 | CC | CC | 19.5 or less |
| Comparative Example 4A | BB | 1310 | 1157 | 757 | CC | CC | 19.5 or less |
| Comparative Example 5A | BB | 1060 | 958 | 558 | CC | CC | 19.5 or less |
| Comparative Example 6A | BB | 850 | 512 | 112 | CC | CC | 19.5 or less |
| Comparative Example 7A | BB | 1200 | 1405 | 1005 | BB | CC | 19.5 or less |
| Reference Example 1A (corresponding to step (1)) | — | Not evaluated | 1454 | 1054 | — | Not evaluated | 2 |
| Reference Example 2A (corresponding to step (2)) | — | Not evaluated | — | — | — | Not evaluated | 3 |
| Comparative Example 8A | BB | 800 | 1454 | 1054 | BB | AA | 52 |

[Example 1B] Resin (X1-1)

A SUS polymerization vessel (internal capacity: 1 L) equipped with a stirrer was charged with 425 mL of purified decane and 0.4 mL (0.4 mmol based on an aluminum atom) of a triethyl aluminum solution (1.0 mmol/mL based on an aluminum atom) at room temperature (25° C.) under a stream of nitrogen. Subsequently, 0.0014 mmol (based on a zirconium atom) of the decane slurry of the prepolymerization catalyst component that had been prepared in Synthesis Example 1 was added thereto, and the temperature was increased to 40° C. After reaching 40° C., 30 NmL of hydrogen was charged thereinto. Subsequently, the polymerization vessel was continuously charged with 106 mL of 4-methyl-1-pentene (4MP-1) at a constant rate over 30 minutes. The start of this charging was referred to as the start of polymerization, and 45° C. was kept for 3 hours (step (1)). After a lapse of 3 hours, the system was depressurized at 45° C. and pressurization and depressurization were performed 3 times using nitrogen (0.6 MPa) in order to discharge residual hydrogen out of the system. Then, 30 NmL of hydrogen was charged thereinto at 45° C. under a stream of nitrogen. Subsequently, the polymerization vessel was continuously charged with a mixed solution of 79.4 mL of 4-methyl-1-pentene and 7.4 mL of 1-decene at a constant rate over 30 minutes. The start of this charging was referred to as the start of polymerization, and 45° C. was kept for 3 hours (step (2)). After a lapse of 3 hours from the start of polymerization, the temperature was decreased to room temperature, followed by depressurization. Immediately thereafter, the polymerization solution (slurry) containing a white solid was filtered, to give a solid substance. This solid substance was dried under reduced pressure at 80° C. for 8 hours, to give 105.4 g of a resin (X1-1). The filtrate was dried under reduced pressure at 120° C., to give a solvent-soluble portion (SP). Various results are shown in Tables 2B and 3B.

Examples 2B to 19B

Each polymer was obtained by the same operation as in Example 1B except that the polymerization conditions were changed as described in Table 1B. Various results are shown in Tables 2B and 3B. In the tables, L168 means a mixture of a linear α-olefin having 16 carbon atoms and a linear α-olefin having 18 carbon atoms (mixing molar ratio: α-olefin having 16 carbon atoms:α-olefin having 18 carbon atoms=60:40).

Examples 20B to 24B

Each polymer was obtained by the same operation as in Example 1B except that: the prepolymerization catalyst component obtained in Synthesis Example 2 was used; and the polymerization conditions were changed as described in Table 1B. Various results are shown in Tables 2B and 3B.

Comparative Example 1B

The same operation as in Example 1B was performed except that the amount of 4MP-1 fed and the amount of 1-decene fed in the step (1), and the amount of 1-decene fed in the step (2) were changed as described in Table 1B. However, the polymer produced in the step (1) was dissolved in the solvent. Therefore, slurry polymerization was unable to be performed, and the polymer was unable to be recovered.

Comparative Examples 2B and 3B

A polymer was obtained by polymerization operation under the conditions described in Table 1B using the solid titanium catalyst component (0.042 mmol based on a Ti atom) described in [Preparation Example 1] and [Preparation Example 2] of WO 2009/008409 instead of the catalyst component. Various results are shown in Tables 2B and 3B. The slurry properties were favorable in Comparative Example 2B, but were poor (gruel-like) in Comparative Example 3B.

Comparison Between Examples and Comparative Examples

All of Examples 1B to 24B had favorable polymerization solution properties, i.e., favorable solid-liquid separability of the slurry. This indicates polymerizability in a wide range of the total comonomer content, or the comonomer content in the polymer in the step (2).

Comparative Example 1B failed to perform slurry polymerization, though in this example, a larger amount of the comonomer in the step (1) than that in the step (2) was used in copolymerization.

Comparative Examples 2B and 3B exhibited poor polymerization solution properties in a region having a large amount of the comonomer fed, though in this example, a so-called Ziegler catalyst was used. Comparative Example 2B had favorable polymerization solution properties, but had a large amount of the solvent-soluble portion as compared with Examples using an equivalent amount of the comonomer fed.

TABLE 1B

| | Step (1) | | | | | | Step (2) | | | | | |
|---|---|---|---|---|---|---|---|---|---|---|---|---|
| | Amount of catalyst (μmol) | Amount of hydrogen (mL) | Amount of 4MP-1 fed (mL) | Amount of comonomer fed Species | (mL) | Polymerization time (h) | Amount of 4MP-1 fed (mL) | Amount of comonomer fed Species | (mL) | Amount of hydrogen (mL) | Polymerization time (h) | Yield (g) |
| Example 1B | 1.4 | 30 | 106.0 | — | 0 | 3.0 | 79.4 | 1-Decene | 7.4 | 30 | 3.0 | 105.4 |
| Example 2B | 1.4 | 30 | 106.0 | — | 0 | 3.0 | 79.4 | 1-Decene | 16.2 | 30 | 3.0 | 124.8 |
| Example 3B | 1.4 | 30 | 106.0 | — | 0 | 3.0 | 79.4 | 1-Decene | 21.8 | 30 | 3.0 | 119.7 |
| Example 4B | 1.4 | 30 | 106.0 | — | 0 | 3.0 | 79.4 | 1-Decene | 27.5 | 30 | 3.0 | 131.5 |
| Example 5B | 1.4 | 30 | 106.0 | — | 0 | 2.0 | 71.7 | 1-Decene | 24.3 | 30 | 3.0 | 104.8 |
| Example 6B | 1.4 | 30 | 106.0 | — | 0 | 1.5 | 55.3 | 1-Decene | 24.3 | 30 | 3.0 | 105.1 |
| Example 7B | 1.4 | 30 | 106.0 | — | 0 | 1.0 | 42.0 | 1-Decene | 24.3 | 30 | 3.0 | 91.0 |
| Example 8B | 1.4 | 30 | 106.0 | 1-Decene | 2.7 | 3.0 | 80.4 | 1-Decene | 23.6 | 30 | 3.0 | 123.3 |
| Example 9B | 1.4 | 30 | 106.0 | 1-Decene | 3.6 | 3.0 | 79.9 | 1-Decene | 23.4 | 30 | 3.0 | 102.3 |
| Example 10B | 1.4 | 60 | 106.0 | — | 0 | 1.5 | 55.9 | 1-Decene | 24.3 | 20 | 4.5 | 93.7 |
| Example 11B | 1.4 | 40 | 150.0 | — | 0 | 3.0 | 70.0 | 1-Decene | 10.5 | 20 | 3.0 | 131.7 |
| Example 12B | 1.4 | 40 | 150.0 | — | 0 | 3.0 | 50.0 | 1-Hexene | 50.0 | 20 | 3.0 | 107.0 |
| Example 13B | 1.4 | 35 | 130.0 | — | 0 | 3.0 | 128.0 | Ethylene | 1400.0 | 10 | 2.5 | 132.5 |
| Example 14B | 1.4 | 40 | 130.0 | — | 0 | 3.0 | 135.0 | L168 | 8.2 | 27 | 1.3 | 115.1 |
| Example 15B | 1.4 | 35 | 130.0 | L168 | 1.7 | 3.0 | 127.0 | L168 | 22.6 | 20 | 1.3 | 106.5 |
| Example 16B | 1.4 | 30 | 106.0 | L168 | 2.8 | 3.0 | 86.1 | L168 | 26.0 | 25 | 3.0 | 139.3 |
| Example 17B | 1.4 | 30 | 106.0 | L168 | 2.8 | 3.0 | 86.1 | L168 | 31.0 | 15 | 3.0 | 81.9 |
| Example 18B | 1.4 | 30 | 106.0 | L168 | 2.8 | 3.0 | 84.0 | L168 | 26.0 | 20 | 3.0 | 103.2 |
| Example 19B | 1.4 | 30 | 106.0 | L168 | 2.8 | 3.0 | 84.0 | L168 | 34.0 | 17.5 | 3.0 | 95.6 |
| Example 20B | 0.9 | 35 | 106.0 | — | 0 | 3.0 | 83.3 | 1-Decene | 21.8 | 35 | 3.0 | 129.0 |
| Example 21B | 0.9 | 40 | 130.0 | 1-Decene | 1.9 | 3.0 | 93.0 | 1-Decene | 38.0 | 25 | 3.0 | 151.8 |
| Example 22B | 0.9 | 45 | 130.0 | 1-Decene | 1.9 | 3.0 | 84.0 | 1-Decene | 46.0 | 25 | 3.0 | 139.1 |
| Example 23B | 0.9 | 35 | 106.0 | L168 | 1.5 | 3.0 | 89.0 | L168 | 26.6 | 22.5 | 3.0 | 127.3 |
| Example 24B | 1.1 | 55 | 208.0 | L168 | 2.95 | 1.25 | 0 | L168 | 30.5 | 22.5 | 4.75 | 154.3 |
| Comparative Example 1B | 1.4 | 30 | 110.0 | 1-Decene | 16.2 | 3.0 | 79.4 | — | 0 | 30 | 3.0 | Not recovered |
| Comparative Example 2B | 42 | 100 | 106.0 | — | 0 | 3.0 | 90.0 | 1-Decene | 7.4 | 100 | 3.0 | 116.2 |
| Comparative Example 3B | 42 | 100 | 106.0 | — | 0 | 3.0 | 90.0 | 1-Decene | 21.8 | 100 | 3.0 | 113.8 |

L168: C16/C18 α-olefin mixture (mixing ratio: C16:C18 = 60:40 m.r.)

TABLE 2B

| | Solvent-soluble portion (wt %) | BD (g/cm³) | Polymerization solution properties | Polymerization activity (kg/mmol-M) | Proportion by mass of polymer produced in step (1) (%) | Proportion by mass of polymer produced in step (2) (%) |
|---|---|---|---|---|---|---|
| Example 1B | 0.04 | 0.375 | Favorable | 75.3 | 48 | 52 |
| Example 2B | 0.03 | 0.375 | Favorable | 89.1 | 41 | 59 |
| Example 3B | 0.09 | 0.381 | Favorable | 85.5 | 42 | 58 |
| Example 4B | 0.27 | 0.380 | Favorable | 93.9 | 38 | 62 |
| Example 5B | 0.42 | 0.376 | Favorable | 74.9 | 43 | 57 |
| Example 6B | 3.13 | 0.393 | Favorable | 75.1 | 33 | 67 |
| Example 7B | 3.70 | 0.380 | Favorable | 65.0 | 28 | 72 |
| Example 8B | 1.99 | 0.387 | Favorable | 88.1 | 43 | 57 |
| Example 9B | 1.92 | 0.362 | Favorable | 73.1 | 52 | 48 |
| Example 10B | 4.30 | 0.398 | Favorable | 66.9 | 43 | 57 |
| Example 11B | 0.43 | 0.413 | Favorable | 94.1 | 70 | 30 |
| Example 12B | 0.63 | 0.409 | Favorable | 76.4 | 78 | 22 |
| Example 13B | 0.32 | 0.410 | Favorable | 94.7 | 55 | 45 |
| Example 14B | 0.18 | 0.404 | Favorable | 82.2 | 67 | 33 |
| Example 15B | 0.20 | 0.396 | Favorable | 76.1 | 68 | 32 |
| Example 16B | 1.70 | 0.402 | Favorable | 99.5 | 39 | 61 |
| Example 17B | 0.32 | 0.400 | Favorable | 58.5 | 67 | 33 |
| Example 18B | 1.24 | 0.411 | Favorable | 73.7 | 53 | 47 |
| Example 19B | 1.21 | 0.388 | Favorable | 68.3 | 58 | 42 |
| Example 20B | 1.38 | 0.415 | Favorable | 143.4 | 41 | 59 |
| Example 21B | 0.78 | 0.434 | Favorable | 168.7 | 49 | 51 |
| Example 22B | 1.49 | 0.428 | Favorable | 154.6 | 55 | 45 |

TABLE 2B-continued

|  | Solvent-soluble portion (wt %) | BD (g/cm³) | Polymerization solution properties | Polymerization activity (kg/mmol-M) | Proportion by mass of polymer produced in step (1) (%) | Proportion by mass of polymer produced in step (2) (%) |
|---|---|---|---|---|---|---|
| Example 23B | 0.04 | 0.427 | Favorable | 141.4 | 43 | 57 |
| Example 24B | 1.03 | 0.427 | Favorable | 140.3 | 50 | 50 |
| Comparative Example 1B | n.a. | n.a. | Solution | n.a. | n.a. | n.a. |
| Comparative Example 2B | 4.60 | 0.378 | Favorable | 2.8 | 50 | 50 |
| Comparative Example 3B | 13.7 | 0.341 | Poor (gruel-like) | 2.7 | 51 | 49 |

L168: C16/C18 α-olefin mixture (mixing ratio: C16:C18 = 60:40 m.r.)
n.a.: not analysys

TABLE 3B

Physical properties of polymer

| | Stereo-regularity (meso diad fraction) (%) | [η] Total (dl/g) | [η] Step (1) (dl/g) | [η] Step (2) (dl/g) | Comonomer Species | Total (wt %) | Total (mol %) | Step (1) (wt %) | Step (1) (mol %) | Step (2) (wt %) | Step (2) (mol %) | DSC Total Tm (° C.) | DSC Total ΔH (J/g) | Step (1) Tm (° C.) | Step (2) Tm (° C.) |
|---|---|---|---|---|---|---|---|---|---|---|---|---|---|---|---|
| Example 1B | 98.9 | 2.6 | 2.1 | 3.1 | 1-Decene | 3.3 | 2.0 | 0 | 0 | 6.3 | 3.9 | 239 | 38.0 | 239 | None |
| Example 2B | >98.5 | 2.3 | 2.0 | 2.4 | 1-Decene | 7.6 | 4.7 | 0 | 0 | 12.8 | 8.1 | 238 | 29.0 | 238 | 171 |
| Example 3B | 98.5 | 2.7 | 1.9 | 3.2 | 1-Decene | 8.6 | 5.3 | 0 | 0 | 14.9 | 9.5 | 238 | 27.0 | 238 | 150 |
| Example 4B | 98.6 | 2.2 | 2.0 | 2.3 | 1-Decene | 9.2 | 5.7 | 0 | 0 | 14.9 | 9.5 | 239 | 26.0 | 239 | None |
| Example 5B | >98.5 | 2.9 | 2.0 | 3.6 | 1-Decene | 9.4 | 5.9 | 0 | 0 | 16.6 | 10.7 | 238 | 26.3 | 238 | 144 |
| Example 6B | >98.5 | 2.7 | 2.2 | 2.9 | 1-Decene | 10.4 | 6.5 | 0 | 0 | 15.5 | 9.9 | 239 | 25.1 | 239 | 141 |
| Example 7B | >98.5 | 2.9 | 2.4 | 3.1 | 1-Decene | 10.9 | 6.8 | 0 | 0 | 15.1 | 9.6 | 239 | 22.9 | 239 | 147 |
| Example 8B | >98.5 | 2.7 | 2.5 | 2.8 | 1-Decene | 9.8 | 6.1 | 3.0 | 1.8 | 14.9 | 9.5 | 225 | 23.6 | 225 | 145 |
| Example 9B | >98.5 | 3.1 | 2.5 | 3.9 | 1-Decene | 10.2 | 6.4 | 3.8 | 2.3 | 17.0 | 10.9 | 220 | 21.7 | 220 | 143 |
| Example 10B | >98.5 | 2.7 | 1.2 | 3.9 | 1-Decene | 10.7 | 6.7 | 0 | 0 | 18.8 | 12.2 | 239 | 26.0 | 239 | 131 |
| Example 11B | >98.5 | 2.1 | 1.8 | 2.8 | 1-Decene | 4.8 | 2.9 | 0 | 0 | 16.0 | 10.3 | 241 | 34.3 | 241 | 173 |
| Example 12B | >98.5 | 2.3 | 1.9 | 3.8 | 1-Hexene | 12.8 | 12.8 | 0 | 0 | 58.5 | 58.5 | 241 | 37.0 | 241 | None |
| Example 13B | >98.5 | 2.8 | 2.3 | 3.5 | Ethylene | 1.6 | 4.7 | 0 | 0 | 3.5 | 9.8 | 239 | 30.0 | 239 | None |
| Example 14B | >98.5 | 2.3 | 1.7 | 3.6 | L168 | 1.9 | 0.7 | 0 | 0 | 5.8 | 2.1 | 237 | 41.0 | 237 | None |
| Example 15B | >98.5 | 2.5 | 2.1 | 3.5 | L168 | 4.0 | 1.4 | 1.9 | 0.7 | 8.5 | 3.2 | 230 | 41.0 | 230 | None |
| Example 16B | >98.5 | 2.4 | 2.2 | 2.4 | L168 | 12.1 | 4.6 | 3.1 | 1.1 | 18.0 | 7.2 | 224 | 15.0 | 224 | None |
| Example 17B | >98.5 | 2.8 | 2.1 | 4.3 | L168 | 8.7 | 3.3 | 2.8 | 1.0 | 20.8 | 8.5 | 226 | 25.0 | 226 | None |
| Example 18B | >98.5 | 3.1 | 2.5 | 3.9 | L168 | 12.6 | 8.2 | 2.8 | 1.7 | 23.8 | 9.9 | 226 | 17.0 | 226 | None |
| Example 19B | >98.5 | 3.1 | 2.3 | 4.2 | L168 | 13.3 | 8.7 | 2.6 | 1.6 | 27.8 | 12.0 | 227 | 21.0 | 227 | None |
| Example 20B | >98.5 | 2.5 | 2.1 | 2.8 | 1-Decene | 10.7 | 6.7 | 0 | 0.0 | 18.2 | 11.8 | 238 | 23.0 | 238 | None |
| Example 21B | >98.5 | 2.7 | 1.7 | 3.6 | 1-Decene | 12.1 | 7.6 | 2.2 | 1.3 | 21.5 | 14.1 | 227 | 18.0 | 227 | None |
| Example 22B | >98.5 | 2.6 | 1.4 | 4.1 | 1-Decene | 13.0 | 8.2 | 1.8 | 1.1 | 26.9 | 18.1 | 230 | 24.0 | 230 | None |
| Example 23B | >98.5 | 3.2 | 2.1 | 4.0 | L168 | 9.1 | 5.8 | 1.8 | 1.1 | 14.7 | 5.7 | 230 | 14.0 | 230 | None |
| Example 24B | >98.5 | 2.5 | 1.7 | 3.3 | L168 | 13.7 | 9.4 | 1.5 | 0.9 | 25.8 | 18.6 | 232 | 21.0 | 232 | None |
| Comparative Example 1B | n.a. | n.a. | n.a. | n.a. | 1-Decene | n.a. | n.a. | n.a. | n.a. | n.a. | n.a. | n.a. | n.a. | n.a. | n.a. |
| Comparative Example 2B | 94.2 | 2.9 | 2.3 | 3.4 | 1-Decene | 5.2 | 3.2 | 0 | 0 | 10.3 | 6.4 | 238 | 32.8 | 238 | None |
| Comparative Example 3B | n.a. | 3.1 | 2.2 | 4.1 | 1-Decene | 9.2 | 5.7 | 0 | 0 | 18.7 | 12.1 | 238 | 28.8 | 238 | None |

L168: C16/C18 α-olefin mixture (mixing ratio: C16:C18 = 60:40 m.r.)
n.a.: not analysys

The invention claimed is:
1. A 4-methyl-1-pentene polymer particle (X) which satisfies the following requirements (X-a), (X-b) and (X-c):
(X-a) being composed of a 4-methyl-1-pentene polymer which has a content of a constitutional unit derived from 4-methyl-1-pentene being 30.0 to 99.7% by mol and which has a content of a constitutional unit derived from at least one olefin selected from ethylene and an α-olefin having 3 to 20 carbon atoms (except for 4-methyl-1-pentene) being 0.3 to 70.0% by mol;
(X-b) having, when measured in a cross fractionation chromatograph apparatus (CFC) using an infrared spectrophotometer as a detector part, at least one peak A of an amount of a component eluted present in the range of 100 to 140° C., and at least one peak B of an amount of a component eluted present at lower than 100° C.; and
(X-c) having a meso diad fraction (m) measured by 13C-NMR falling within the range of 95.0 to 100%.
2. The 4-methyl-1-pentene polymer particle (X) according to claim 1, containing 10.0 to 95.0 parts by mass of a 4-methyl-1-pentene polymer (x1) which satisfies the following requirement (x1-a), and 5.0 to 90.0 parts by mass of a 4-methyl-1-pentene copolymer (x2) which satisfies the fol- lowing requirement (x2-a) (provided that a total amount of the polymer (x1) and the copolymer (x2) is 100 parts by mass):
- (x1-a) having a content of a constitutional unit derived from 4-methyl-1-pentene being 80.0 to 100% by mol, and a content of a constitutional unit derived from at least one olefin selected from ethylene and an α-olefin having 3 to 20 carbon atoms (except for 4-methyl-1-pentene) being 0 to 20.0% by mol; and
- (x2-a) having a content of a constitutional unit derived from 4-methyl-1-pentene being 20.0 to 98.0% by mol, and a content of a constitutional unit derived from at least one olefin selected from ethylene and an α-olefin having 3 to 20 carbon atoms (except for 4-methyl-1-pentene) being 2.0 to 80.0% by mol and being larger than the content of the constitutional unit derived from at least one olefin selected from ethylene and an α-olefin having 3 to 20 carbon atoms (except for 4-methyl-1-pentene) in the polymer (x1).

3. The 4-methyl-1-pentene polymer particle (X) according to claim 2, wherein
the polymer (x1) has an intrinsic viscosity [η] of in the range of 0.5 to 20 dl/g measured in decalin of 135° C., and a melting point (Tm) of in the range of 210 to 260° C. measured by DSC, and
the copolymer (x2) has an intrinsic viscosity [η] of in the range of 0.5 to 20 dl/g measured in decalin of 135° C., and a melting point (Tm) of in the range of lower than 210° C. measured by DSC, or NO detected peak indicating a melting point in DSC measurement.

4. The 4-methyl-1-pentene polymer particle (X) according to claim 1, having an intrinsic viscosity [η] measured in decalin of 135° C. falling within the range of 0.5 to 10.0 dl/g.

5. The 4-methyl-1-pentene polymer particle (X) according to claim 1, wherein in the requirement (X-c), the meso diad fraction (m) falls within the range of 98.0 to 100%.

6. A resin composed of a 4-methyl-1-pentene polymer particle (X) according to claim 1.

7. A resin composition comprising a resin according to claim 6.

8. A molded article obtained by molding from a 4-methyl-1-pentene polymer particle (X) according to claim 1.

9. A method for producing a 4-methyl-1-pentene resin (X), comprising the steps of:
- (1) producing a 4-methyl-1-pentene polymer (x1) which satisfies the following requirement (x1-a) by slurry polymerization using a metallocene catalyst; and
- (2) producing a 4-methyl-1-pentene copolymer (x2) which satisfies the following requirement (x2-a) by slurry polymerization using a metallocene catalyst in the presence of the polymer (x1) obtained in the step (1) such that an amount of the copolymer (x2) falls within the range of 5.0 to 90.0 parts by mass with respect to 100 parts by mass in total of the polymer (x1) and the copolymer (x2):
  - (x1-a) having a content of a constitutional unit derived from 4-methyl-1-pentene being 80.0 to 100% by mol, and a content of a constitutional unit derived from at least one olefin selected from ethylene and an α-olefin having 3 to 20 carbon atoms (except for 4-methyl-1-pentene) being 0 to 20.0% by mol; and
  - (x2-a) having a content of a constitutional unit derived from 4-methyl-1-pentene being 20.0 to 98.0% by mol, and a content of a constitutional unit derived from at least one olefin selected from ethylene and an α-olefin having 3 to 20 carbon atoms (except for 4-methyl-1-pentene) being 2.0 to 80.0% by mol and being larger than the content of the constitutional unit derived from at least one olefin selected from ethylene and an α-olefin having 3 to 20 carbon atoms, other than 4-methyl-1-pentene, in the polymer (x1).

10. The method for producing a 4-methyl-1-pentene resin (X) according to claim 9, wherein
the polymer (x1) has an intrinsic viscosity [η] of in the range of 0.5 to 20 dl/g measured in decalin of 135° C., and a melting point (Tm) of in the range of 210 to 260° C. measured by DSC, and
the copolymer (x2) has an intrinsic viscosity [η] of in the range of 0.5 to 20 dl/g measured in decalin of 135° C., and a melting point (Tm) of in the range of lower than 210° C. measured by DSC, or NO detected peak indicating a melting point in DSC measurement.

11. The method for producing a 4-methyl-1-pentene resin (X) according to claim 9, wherein a temperature at which the polymerization in the step (1) is performed and a temperature at which the polymerization in the step (2) each independently fall within the range of 0 to 100° C.

12. The method for producing a 4-methyl-1-pentene resin (X) according to claim 9, wherein the metallocene catalyst comprises a metallocene compound (A) and is a catalyst in the form of particles having D50 of volume statistics of in the range of 1 to 500 μm.

13. The method for producing a 4-methyl-1-pentene resin (X) according to claim 9, wherein the metallocene catalyst comprises a metallocene compound (A) and a support (B), and the support (B) is a support in the form of particles comprising 20% by mass or more of an aluminum atom and having D50 of volume statistics in the range of 1 to 500 μm.

14. A 4-methyl-1-pentene resin (X) obtained by the method for producing a 4-methyl-1-pentene resin (X) according to claim 9.

15. A resin composition comprising the 4-methyl-1-pentene resin (X) according to claim 14.

16. A molded article obtained by molding from the 4-methyl-1-pentene resin (X) according to claim 14.

17. A molded article obtained by molding from a 4-methyl-1-pentene resin (X) according to claim 6.

18. A molded article obtained by molding from a 4-methyl-1-pentene polymer a resin composition (X) according to claim 7.

19. A molded article obtained by molding from the 4-methyl-1-pentene resin composition (X) according to claim 7.

* * * * *